United States Patent
Raghu et al.

(10) Patent No.: US 9,959,624 B2
(45) Date of Patent: May 1, 2018

(54) EARLY DETECTION OF TURNING CONDITION IDENTIFICATION USING PERCEPTION TECHNOLOGY

(71) Applicants: VOLKSWAGEN AG, Wolfsburg (DE); AUDI AG, Ingolstadt (DE)

(72) Inventors: Kaushik Raghu, Redwood City, CA (US); Schmidts Beatrix, Buxheim (DE)

(73) Assignees: Volkswagen AG (DE); Audi AG (DE)

( * ) Notice: Subject to any disclaimer, the term of this patent is extended or adjusted under 35 U.S.C. 154(b) by 215 days.

(21) Appl. No.: 14/996,628

(22) Filed: Jan. 15, 2016

(65) Prior Publication Data

US 2016/0176358 A1 Jun. 23, 2016

Related U.S. Application Data

(63) Continuation-in-part of application No. 14/579,144, filed on Dec. 22, 2014.

(51) Int. Cl.
| | |
|---|---|
| *B60R 1/00* | (2006.01) |
| *G06T 7/00* | (2017.01) |
| *G06K 9/00* | (2006.01) |

(52) U.S. Cl.
CPC ............... *G06T 7/004* (2013.01); *B60R 1/00* (2013.01); *G06K 9/00798* (2013.01); *G06K 9/00818* (2013.01); *B60R 2300/308* (2013.01)

(58) Field of Classification Search
None
See application file for complete search history.

(56) References Cited

U.S. PATENT DOCUMENTS

| | | |
|---|---|---|
| 4,970,653 A | 11/1990 | Kenue |
| 2010/0121561 A1* | 5/2010 | Kodaira ............... G01C 11/02 701/532 |
| 2013/0049988 A1 | 2/2013 | Roeber et al. |
| 2013/0101174 A1 | 4/2013 | Meis et al. |
| 2014/0156182 A1* | 6/2014 | Nemec ................. G05D 1/021 701/430 |
| 2014/0222280 A1* | 8/2014 | Salomonsson ........ G08G 1/167 701/28 |

FOREIGN PATENT DOCUMENTS

| | | |
|---|---|---|
| DE | 102004060432 A1 | 8/2006 |
| DE | 102012111933 A1 | 6/2014 |

* cited by examiner

*Primary Examiner* — Eileen Adams
(74) *Attorney, Agent, or Firm* — Barnes & Thornburg LLP

(57) ABSTRACT

An in-vehicle system for identifying turn-only and shared turn lanes and identifying turn rules according to visual indicia captured from turn signs. An image apparatus configured to obtain image data including graphic data and/or text data from a roadway sign, as well as street light image data for an intersection on the roadway. The image data may be processed to detect a graphic image and/or text from the image data relating to the roadway sign. Street light image data may also be captured and processed to determine a street light status. An identification module may determine rules for turning on the intersection of the roadway based on the processed image data relating to the roadway sign, wherein the identification module is further configured to determine if the turn on the roadway is allowed based on the determined street light status.

23 Claims, 18 Drawing Sheets

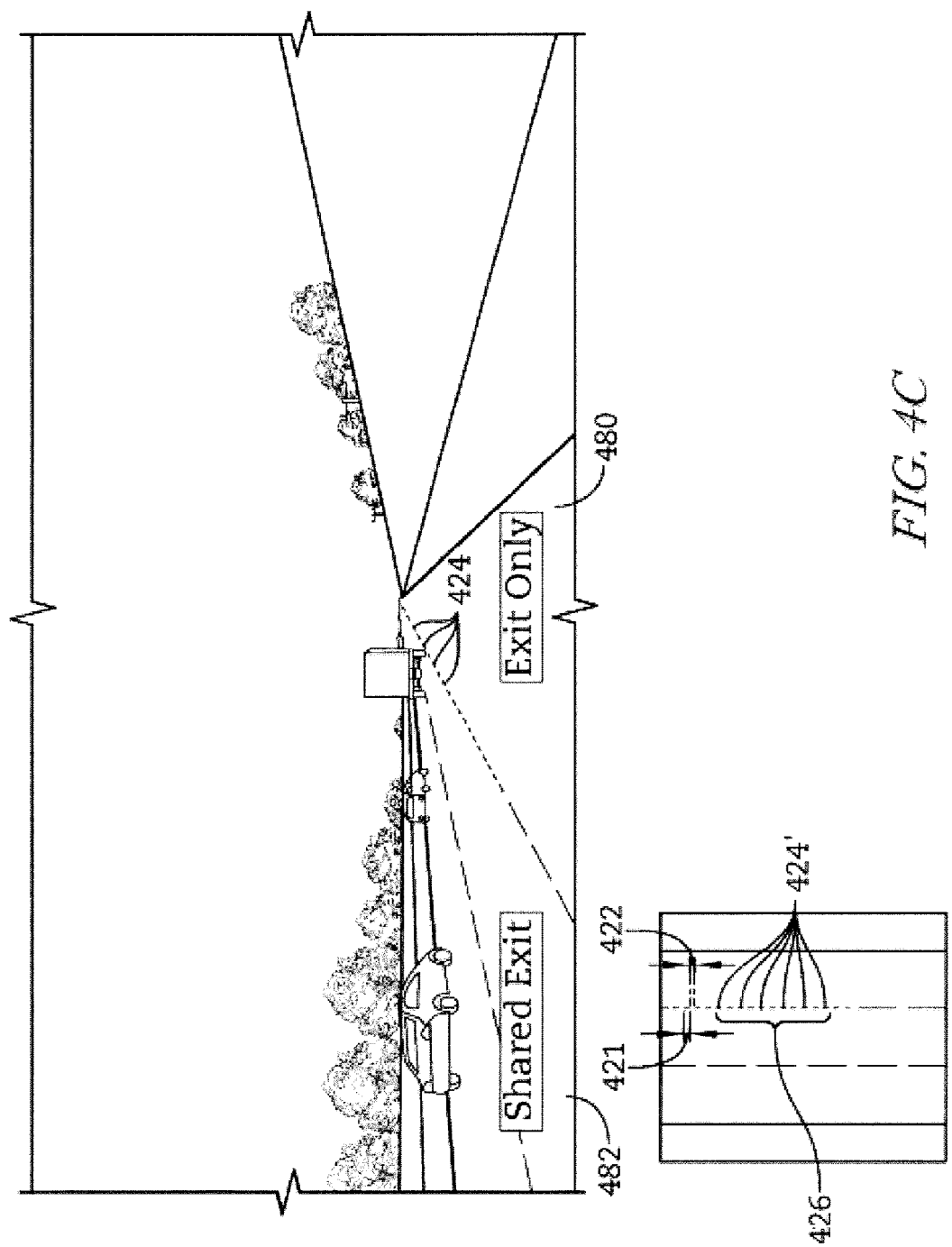

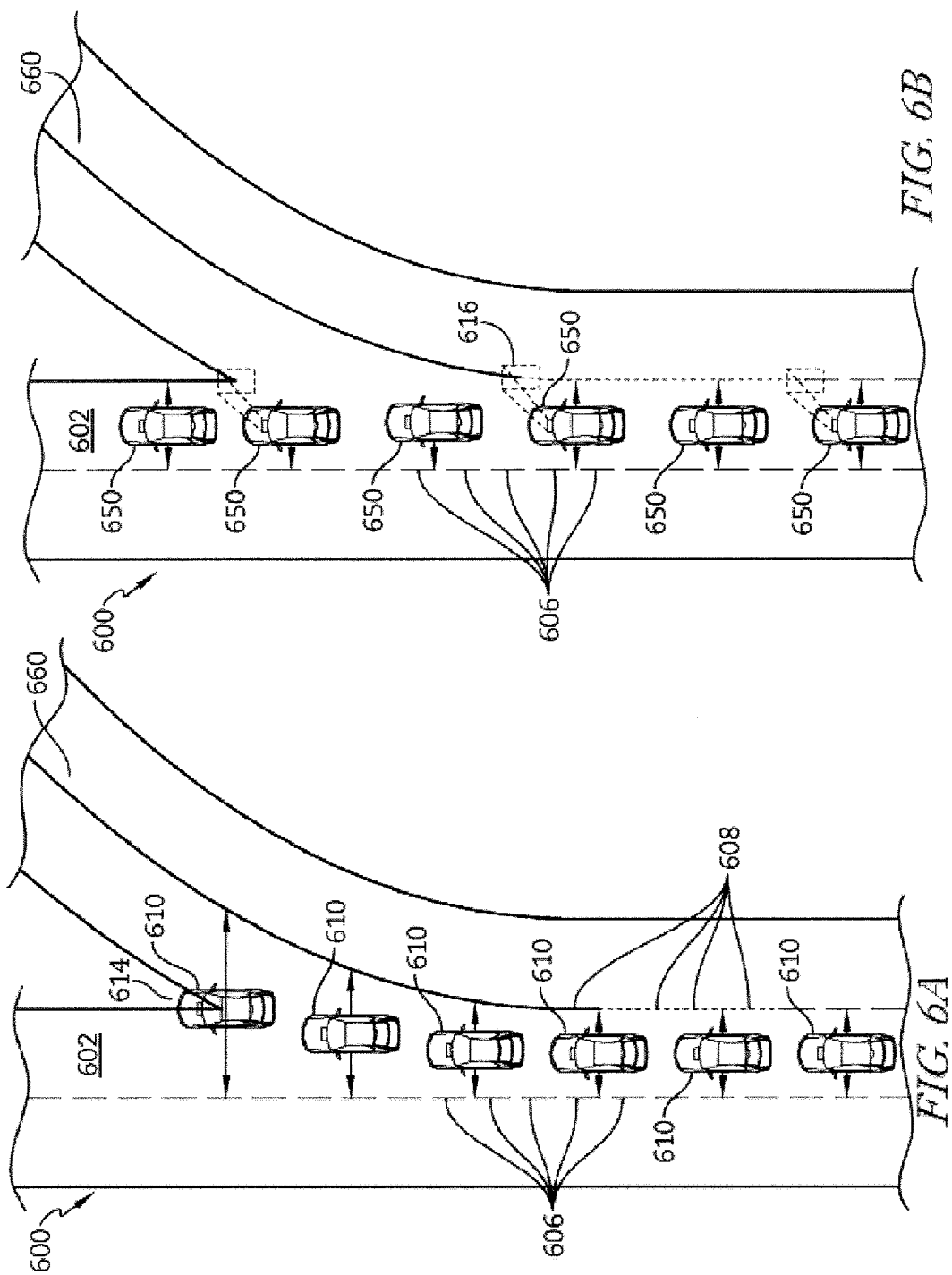

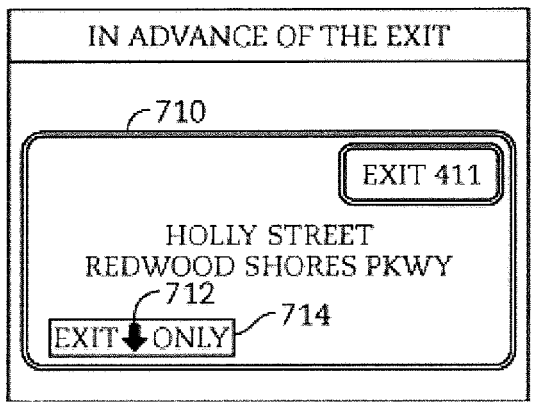
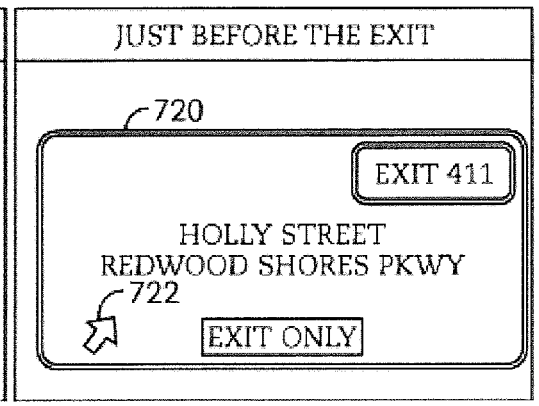
FIG. 7A                FIG. 7B
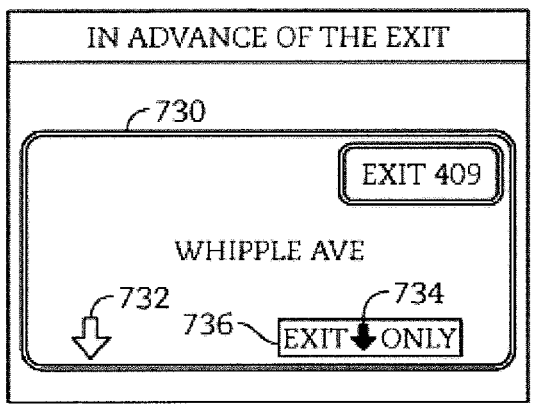
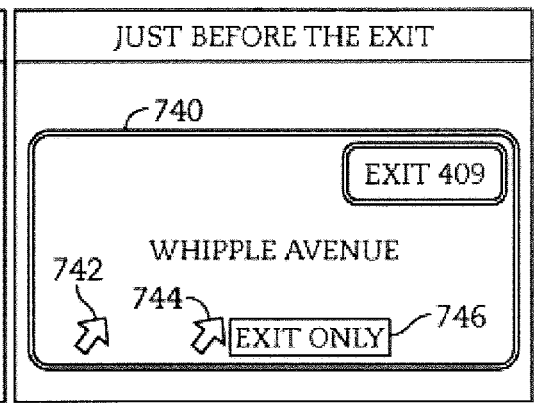
FIG. 7C                FIG. 7D
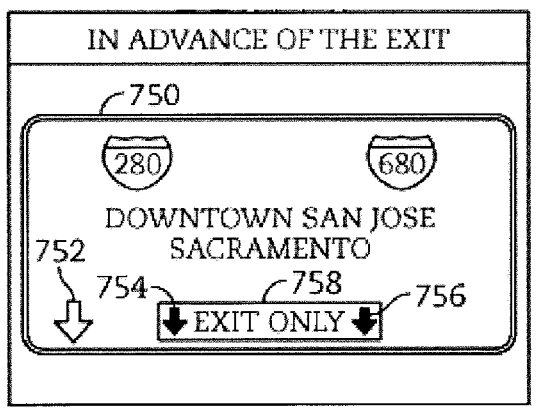
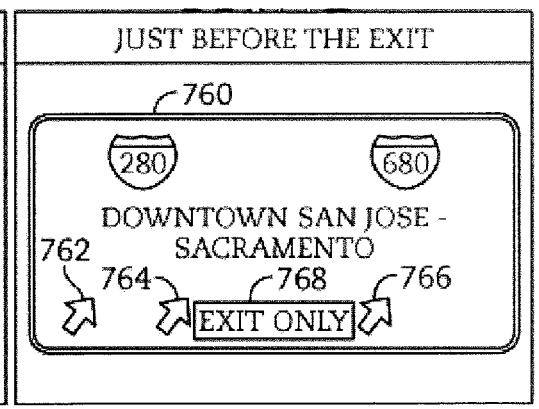
FIG. 7E                FIG. 7F

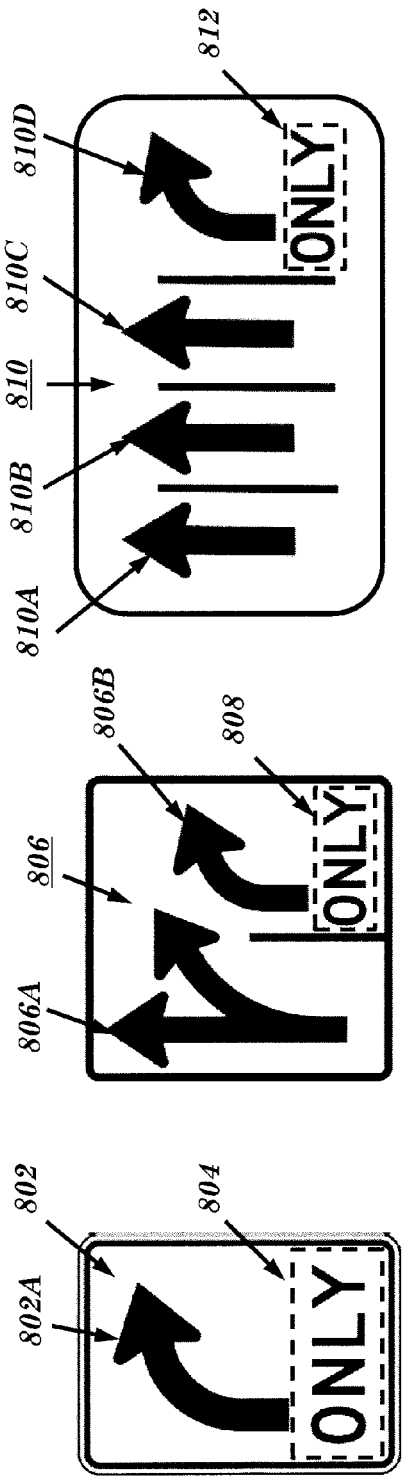
FIG. 8C
FIG. 8B
FIG. 8A
FIG. 8E
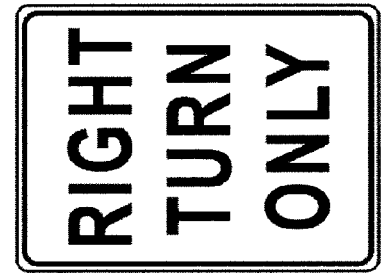
FIG. 8D

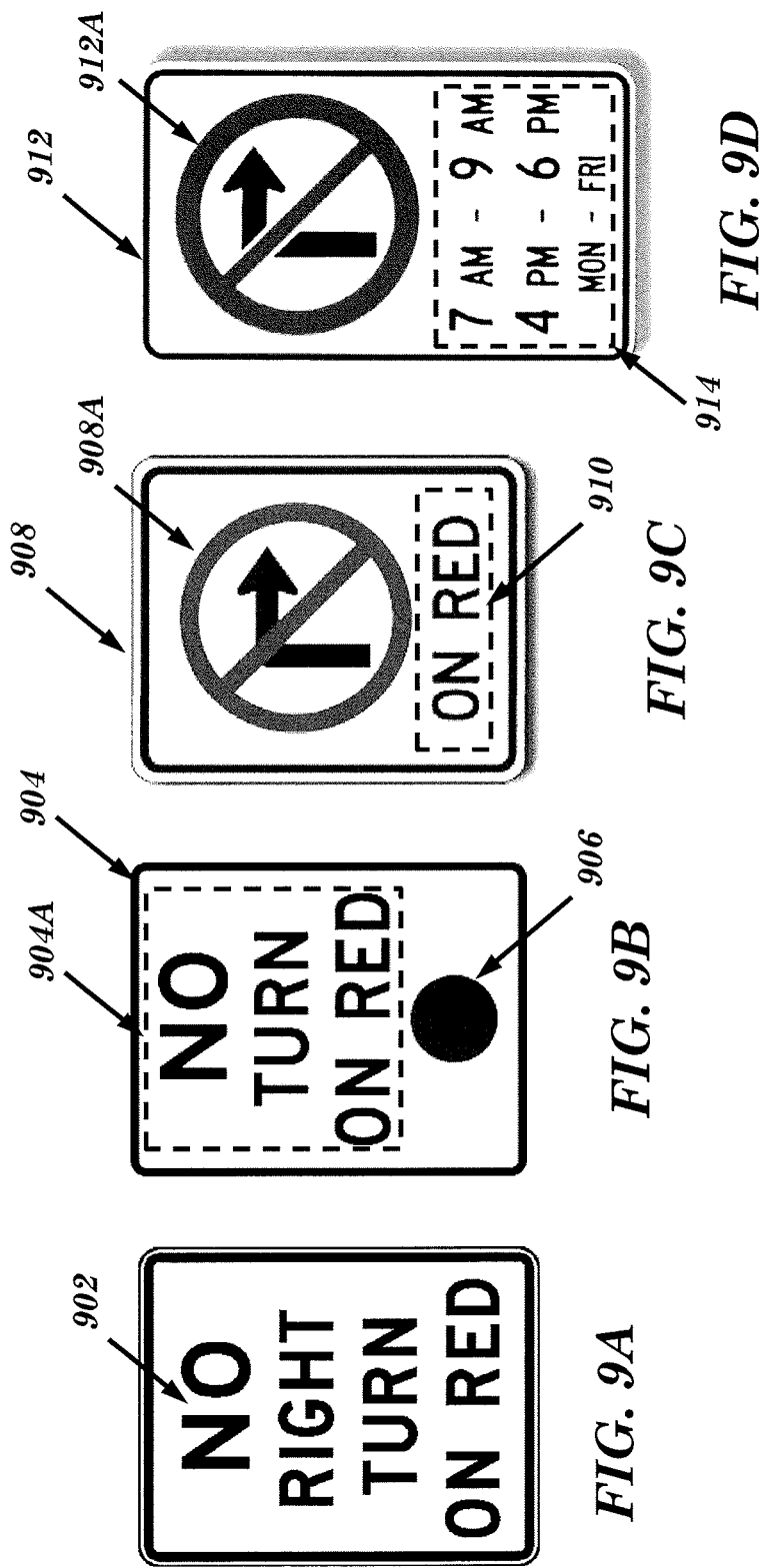

*(At Exit/Intersection)*

*(In Advance of Exit/Intersection)*

# EARLY DETECTION OF TURNING CONDITION IDENTIFICATION USING PERCEPTION TECHNOLOGY

RELATED APPLICATIONS

The present application is a continuation-in-part of U.S. patent application Ser. No. 14/579,144, to Raghu, et al., titled "Early Detection of Exit only and Shared Lanes Using Perception technology," filed Dec. 22, 2014, the content of which is incorporated by reference in its entirety herein.

BACKGROUND

The present disclosure relates to systems, components, and methodologies for determining a position and turning status identification for a vehicle. In particular, the present disclosure relates to systems, components, and methodologies that improve determinations of allowable turning conditions for a vehicle on a roadway having intersections or exits using captured visual indicia.

SUMMARY

According to the present disclosure, systems, components, and methodologies are provided for determining a position of a vehicle on a roadway having exits.

In illustrative embodiments, in-vehicle systems are disclosed for determining rules for a turn on a roadway, the system comprising: a first image apparatus for obtaining lane marking image data from the roadway; a lane marking detection module for detecting lane markings on the roadway from the lane marking image data; a second image apparatus for obtaining at least one of image data and text data from a roadway sign; a sign analyzer module for detecting at least one of a graphic image and text from the at least one of image data and text data respectively; means for detecting lane markings as one of standard frequency dashed lane markings, high frequency dashed lane markings, and solid lane markings and for identifying a turn-only lane and a shared turn lane in response to the detected lane markings; and means for determining rules for turning for an intersection of the roadway based on the at least one of the graphic image and text.

In other illustrative embodiments, in-vehicle systems are disclosed for determining rules for a turn on a roadway, the system comprising: an image apparatus configured to obtain image data comprising (i) at least one of graphic data and text data from a roadway sign, and (ii) street light image data for an intersection on the roadway; an analyzer module configured to process the image data to detect at least one of a graphic image and text from the image data relating to the roadway sign, and to process the street light image data to determine a street light status; and an identification module for determining rules for turning on the intersection of the roadway based on the processed image data relating to the roadway sign, wherein the identification module is further configured to determine if the turn on the roadway is allowed based on the determined street light status.

In certain illustrative embodiments, methods are disclosed for determining rules for a turn on a roadway via an in-vehicle system, comprising: obtaining image data via an image apparatus, the image data comprising (i) at least one of graphic data and text data from a roadway sign, and (ii) street light image data for an intersection on the roadway; processing the image data via an analyzer module to detect at least one of a graphic image and text from the image data relating to the roadway sign, and to process the street light image data to determine a street light status; and determining rules for turning on the intersection of the roadway, via an identification module, based on the processed image data relating to the roadway sign, wherein the identification module is further configured to determine if the turn on the roadway is allowed based on the determined street light status.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 4C shows exemplary image data captured by a lane identification system and an exemplary output of a lane marking detection module in accordance with the present disclosure, and suggests that the lane identification system has detected a transition in lane markings on the left side of the vehicle from standard frequency lane markings to high frequency lane markings, indicating that the presently occupied lane of the vehicle is an exit-only lane and the neighboring left lane of the vehicle is a shared exit lane;

FIG. 6A shows a vehicle in a shared exit lane having an autonomous driving system that is not equipped with a lane identification system in accordance with the present disclosure, and suggests that the autonomous driving system erroneously seeks to center the vehicle between left side and right side lane markings, resulting in a potential collision;

FIG. 6B shows a vehicle in a shared exit lane having an autonomous driving system similar to that of FIG. 6A, except that the vehicle depicted in FIG. 6B is equipped with an identification system in accordance with the present disclosure, and suggests that the lane identification system averts a collision by causing the autonomous driving system to ignore right side lane markings of the shared exit lane until passage of an exit;

FIGS. 7A-B show exit signs that can be detected by an identification system in accordance with the present disclosure having characteristics by which the identification system may identify one exit-only lane;

FIGS. 7C-D show exit signs that can be detected by an identification system in accordance with the present disclosure having characteristics by which the identification system may identify one exit-only lane and one shared exit lane;

FIGS. 7E-F show exit signs that can be detected by an identification system in accordance with the present disclosure having characteristics by which the identification system may identify two exit-only lanes and one shared exit lane;

FIGS. 8A-8E show turn signs that can be detected by an identification system in accordance with the present disclosure having characteristics by which the identification system may identify graphic and text data from the turn signs;

FIGS. 9A-9D show turn signs that can be detected by an identification system in accordance with the present disclosure having characteristics by which the identification system may identify graphic, text data and complex text data from the turn signs;

DETAILED DESCRIPTION

Figure 1:
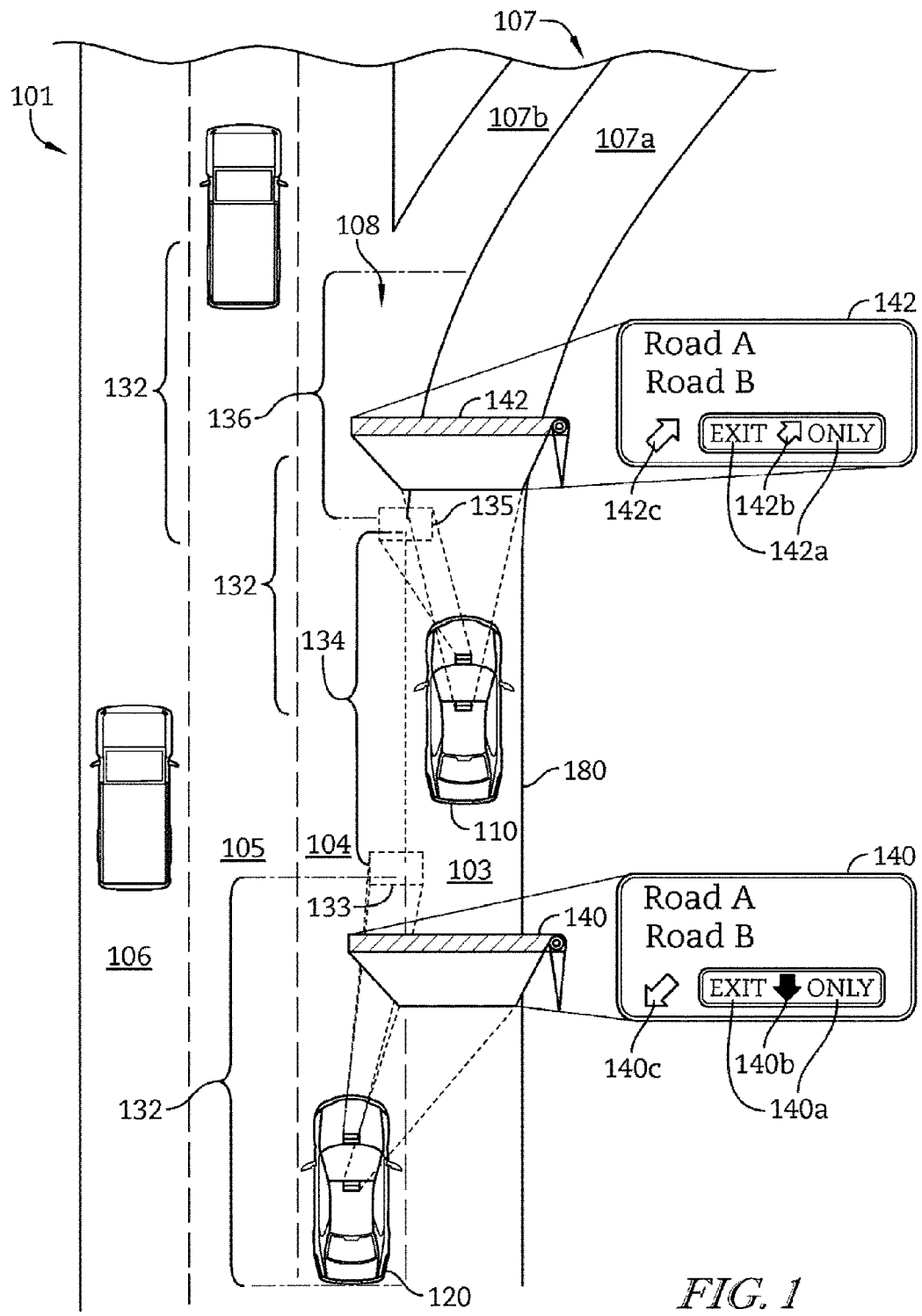
FIG. 1 shows vehicles equipped with lane identification systems in accordance with the present disclosure driving on a roadway having standard lanes, a shared exit lane, and an exit-only lane, and suggests that the lane identification systems are identifying exit-only and shared exit lanes by detecting exit signs and detecting lane marking characteristic of exit-only and shared exit lanes, including high frequency lane markings and solid lane markings.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Furthermore, it will be understood that the term "module" as used herein does not limit the functionality to particular physical modules, but may include any number of software and/or hardware components. In general, a computer program product in accordance with one embodiment comprises a tangible computer usable medium (e.g., RAM, ROM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

An overview of systems, components, and methodologies in accordance with the present disclosure will be provided with reference to FIG. 1. FIG. 1 shows a first vehicle 110 and a second vehicle 120 driving on a roadway 101. Roadway 101 includes lanes 103, 104, 105, and 106, and an exit 107. The term "exit" as used herein may refer to a highway exit, a road exit, a road intersection that may include signage or one or more traffic lights, or any other road configuration that allows or requires a driver to change direction from a straight or predefined road path. For the purposes of the present disclosure "exit" should be interpreted synonymously as "turn" (e.g., exit lane, turn lane; exit sign, turning sign, etc.). In the example of FIG. 1, lanes 105 and 106 are standard lanes that follow road path trajectories along roadway 101 without departing via exit 107. Lane 104 is a shared exit lane, in that vehicles occupying lane 104 have an option at a branch location 108 to either continue on lane 104 as it follows a trajectory along roadway 101, or to take exit 107 by merging into lane 107b of exit 107. Finally, lane 103 is an exit-only lane. A vehicle occupying lane 103 would take exit 107 without having the opportunity to merge back onto roadway 101, because lane 103 merges into lane 107a of exit 107. In this illustrative example, first vehicle 110 occupies exit-only lane 103, and second vehicle 120 occupies shared exit lane 104.

First vehicle 110 and second vehicle 120 each include a lane identification system 200 that identifies the presence and location of exit-only lanes and shared exit lanes, and whose components and implementation will be described in further detail in connection with FIG. 2. Lane identification system 200 may identify exit-only lanes (and, by the same token, turn-only lanes) by detecting lane markings on roadway 101 characteristic of exit-only (turn-only) lanes, and by identifying characteristics of signs indicating the presence of exit-only lanes. Lane identification system 200 may identify shared exit lanes by identifying characteristics of exit signs indicating the existence of shared exit lanes. Moreover, lane identification system 200 may determine the location of both exit-only lanes and shared exit lanes by factoring the side of vehicle 110, 120 on which characteristic lane markings are detected.

Lane identification system 200 collects and analyzes data regarding lane markings on roadway 101 to identify the presence and location of exit-only lanes. Lane markings on the roadway 101 may fall into categories, including standard frequency lane markings 132, high frequency lane markings 134, and solid lane markings 136. Generally, standard frequency lane markings 132 may delineate lanes that proceed on roadway 101 without departing via exit 107. In this illustration, lanes 105 and 106 are delineated by standard frequency lane markings 132. High frequency lane markings 134 may be used to signify the existence of exit-only lanes. In this illustration, high frequency lane markings 134 signify that lane 103 is exit-only. Solid lane markings 136 may delineate exiting lanes when an exit is impending. In this illustration, solid lane markings 136 delineate lanes 107a and 107b of exit 107.

Lane identification system 200 categorizes different types of lane markings 132, 134, 136 to detect exit-only lanes, shared exit lanes, and impending exits. For example, when lane identification system 200 detects a transition from standard frequency lane markings 132 to high frequency lane markings 134, lane identification system 200 determines that an exit-only lane is present. In this illustration, lane identification system 200 of vehicle 120 detects a transition 133 between standard frequency lane markings 132 and high frequency lane markings 134. Accordingly, lane identification system 200 of vehicle 120 determines that an exit-only lane is present. Similarly, lane identification system 200 for vehicle 110 detects a transition 135 between high frequency lane markings 134 and solid lane markings 136. Accordingly, lane identification system 200 of vehicle 110 determines that exit 107 is imminent.

In addition to detecting the presence of exit-only lanes, lane identification system 200 also uses detection of lane markings 132, 134, 136 to determine the location of exit-only lanes. In this illustration, exit 107 is on a right side of roadway 101. Accordingly, lane identification system 200 concludes that exit-only lanes will be on the right side of roadway 101. When high frequency lane markings 134 are detected on a right side of a vehicle 110, 120, lane identification system 200 determines that a neighboring right lane is exit-only, as this would be the conclusion consistent with exit-only lanes being on the right side of roadway 101. However, when high frequency lane markings 134 are detected on a left side of a vehicle 110, 120, lane identification system 200 determines that a presently occupied lane is exit-only, as this would be the conclusion consistent with exit-only lanes being on the right side of roadway 101. As will be explained, lane identification system 200 may apply alternative logic in situations where exit 107 is on a left side of roadway 101.

In the illustration of FIG. 1, lane identification system 200 of vehicle 120 may detect high frequency lane markings 134 on a right side of vehicle 120, and thus determines that neighboring right lane 103 is exit-only. In contrast, lane identification system 200 of vehicle 110 may detect high frequency lane markings 134 on a left side of vehicle 110, so lane identification system 200 determines that presently occupied lane 103 is exit-only.

Lane identification system 200 also uses the data collected regarding exit signs 140, 142 to identify exit-only and shared exit lanes. For roadways that include multiple exit lanes, exit signs 140, 142, may include multiple arrows representing respective exit lanes, and each arrow may present different characteristics depending on whether a corresponding exit lane is exit-only or shared. In certain roadway environments, for example, arrows representing exit-only lanes are colored black and may be located near text indicating that a corresponding lane is exit-only. Arrows representing shared exit lanes may instead be colored white, and may not be located near text indicating that a corresponding lane is exit-only. Moreover, the orientation of arrows may vary depending on whether an exit will be some distance ahead, or whether an exit is impending.

In the example of FIG. 1, arrows 140*b*, 142*b* correspond to lane 103. Arrow 140*b* is colored black, and arrows 140*b*, 142*b* are located near "EXIT ONLY" text 140*a*, 142*a*, which suggests that lane 103 is exit-only. Arrows 140*c*, 142*c* correspond to lane 104. Arrow 140*c* is colored white, and arrows 140*c*, 142*c* are located remote from "EXIT ONLY" text 140*a*, 142*a*, which suggest that lane 104 is shared. Moreover, arrows 140*b*, 140*c* are oriented generally downwards, while arrows 142*b*, 142*c* are oriented generally upwards. This indicates that when a vehicle is near exit sign 140, an exit is still a certain distance away, but when a vehicle is near exit sign 142, an exit is impending. As will be explained in more detail, lane identification system 200 analyzes such characteristics of arrows 140*b*, 142*b*, 140*c*, 142*c* to detect the presence of exit-only lanes, shared exit lanes, and exits.

In addition to detecting the presence of shared exit lanes, lane identification system 200 may also determine the location of shared exit lanes. In the example of FIG. 1, exit 107 is on a right side of roadway 101. As previously explained, lane identification system 200 concludes that exit-only lanes will be on the right side of roadway 101. As a result, to the extent there are shared exit lanes, such shared exit lanes would be to the left of exit-only lanes. When lane identification system 200 concludes that a shared exit lane exists (e.g., based on analysis of exit signs), and lane identification system 200 detects high frequency lane markings 134 on a left side of a vehicle 110, 120, lane identification system 200 determines that a presently occupied lane is exit-only lane and a neighboring left lane is shared. This conclusion is consistent with shared exit lanes being to the left of exit-only lanes. When high frequency lane markings 134 are detected on a right side of a vehicle 110, 120, lane identification system 200 determines that a neighboring right lane is exit-only lane, and a presently occupied lane is shared. This conclusion is also consistent with shared exit lanes being to the left of exit-only lanes. As will be explained below, lane identification system 200 may apply alternative logic in situations where exit 107 is on a left side of roadway 101.

In the illustration of FIG. 1, lane identification system 200 of vehicle 120 determines the presence of a shared exit lane through detection and analysis of characteristics of arrows 140*c*, 142*c*, as summarized above. Because lane identification system 200 of vehicle 120 detects high frequency lane markings 134 on a right side of vehicle 120, it concludes that neighboring right lane 103 is exit-only while presently occupied lane 104 is shared. Lane identification system 200 of vehicle 110 also detects the presence of a shared exit lane through its detection and analysis of characteristics of arrows 140*c*, 142*c*. Because lane identification system 200 of vehicle 110 detects high frequency lane markings 134 on a left side of vehicle 110, it concludes that presently occupied lane 103 is exit-only whereas neighboring left lane 104 is shared.

As summarized above, lane identification systems in accordance with the present disclosure provide a technical solution to the problem of providing accurate and timely identifications of exit-only and shared lanes, including the relative position of exit-only and shared lanes. Such precise and timely identifications are beneficial for several reasons.

In one respect, lane identification system 200 may improve performance by allowing a vehicle in an exit-only or shared exit lane to timely modify an autonomous driving mode and/or to provide a turn engagement signal to enable the vehicle to turn at an intersection or exit. Vehicles 110, 120 may have an autonomous driving system 208 (shown in FIG. 2) that may be programmed with different profiles or modes suitable for different respective driving conditions, including profiles for ordinary highway driving, highway driving where an exit is nearby, exit-only lane driving, shared exit lane driving, ramp driving, or others. Autonomous driving system 208 may use a less conservative profile for ordinary highway driving, a more conservative profile where an exit is nearby, a still more conservative profile when driving on an exit-only lane, etc. By providing accurate and timely identifications of exit-only and shared exit lanes, lane identification system 200 enables vehicles 110, 120 to timely and reliably switch to a driving profile suitable for use in present driving conditions.

Alternatively, lane identification system 200 may allow vehicles 110, 120 to notify drivers that vehicles 110, 120 are in exit-only or shared exit lanes, and provide drivers an opportunity to assume control of vehicles 110, 120. A driver may want autonomous driving system 208 to operate when vehicles 110, 120 are following a trajectory on roadway 101, but may wish to assume control of a vehicle 110, 120 on exit 107. Thus, it may be beneficial for vehicles 110, 120 to issue notifications to drivers that they are in exit-only or shared exit lanes, and allow drivers to assume control of vehicles 110, 120. If a driver intends to take exit 107, the driver can navigate vehicles 110, 120 through exit 107. If a driver does not intend to take exit 107, the driver can merge out of lane 103 (an exit-only lane) or lane 104 (a shared exit lane) and at a later time, when desired, reengage autonomous driving.

In another respect, lane identification system 200 may improve performance of autonomous driving system 208. Autonomous driving system 208 may navigate a vehicle based on navigation input from navigation system 206 (shown in FIG. 2). Navigation system 206 may provide directional instructions to autonomous driving system 208, including when autonomous driving system 208 should stay on roadways or take exits. Accordingly, autonomous driving system 208 would benefit from timely and accurate indications of whether it is in exit-only or shared exit lanes, so that autonomous driving system 208 can accurately and reliably follow instructions from navigation system 206 to take exits or to avoid exits.

In still another respect, lane identification system 200 may improve performance of autonomous driving system 208 for the specific circumstance in which a vehicle 120 is operating in a shared exit lane, such as lane 104. Ordinarily, an autonomous driving system may seek to center a vehicle between lane markings delineating the boundaries of the presently occupied lane. As will be discussed in more detail in connection with FIGS. 6A-B, such a methodology may be inadequate and dangerous for a vehicle occupying a shared exit lane. Timely and accurate detection of shared exit lanes can help autonomous driving systems use an alternate methodology suitable for shared exit lanes.

While vehicles 110, 120 may have certain native technology providing location resolution, such native technology may be unable to identify and locate exit-only and shared exit lanes. For example, GPS may not have sufficient spatial resolution to distinguish between exit-only or shared exit lanes, and there may not be a mapping application available on vehicles 110, 120 that included pre-programmed information on which specific highway lanes in a geographic locale are exit-only lanes or shared exit lanes.

Figure 2:
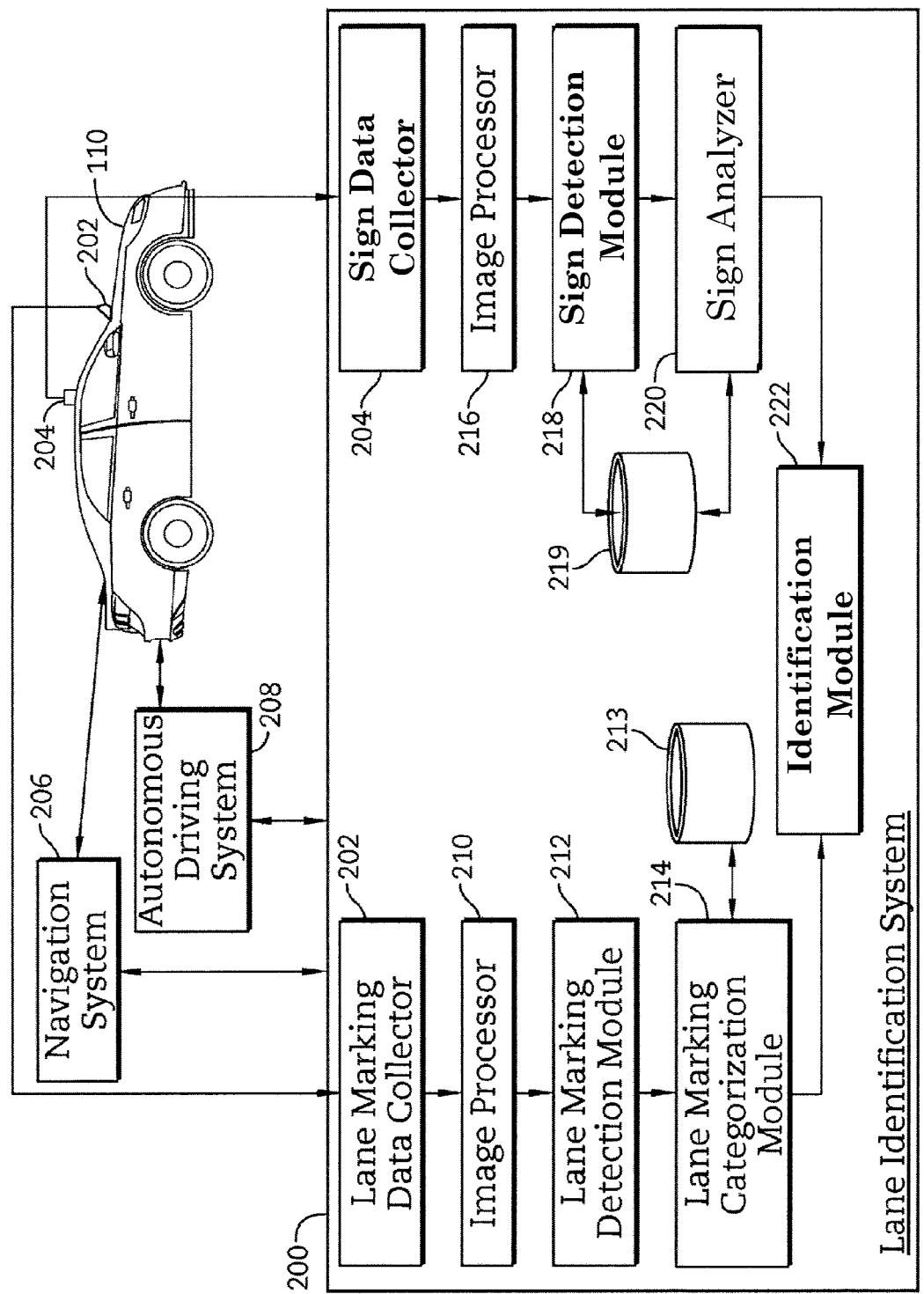
FIG. 2 is a diagrammatic view of a lane identification system in accordance with the present disclosure that includes one or more data collectors configured to collect lane marking and exit sign data, one or more image processors configured to process data collected by the one or more data collectors, a lane marking detection module configured to detect lane markings on a roadway, a lane marking categorization module configured to categorize detected lane markings as standard frequency, high frequency, or solid lane markings, an exit sign detection module configured to detect roadway exit signs, an exit sign analyzer configured to analyze characteristics of detected exit signs, and a lane identification module configured to identify and locate exit-only and shared exit lanes on a roadway, and shows that the lane identification system communicates with a navigation system and an autonomous driving system.

FIG. 2 shows a lane identification system 200 in accordance with the present disclosure. FIG. 2 shows that lane identification system 200 is provided on vehicle 110, which also includes navigation system 206 and autonomous driving system 208. Although navigation system 206 and autonomous driving system 208 are shown as separate from lane identification system 200, in other embodiments, either or both of navigation system 206 and autonomous driving system 208 may be provided as part of lane identification system 200.

Lane identification system 200 includes certain components for detecting and analyzing lane markings. These components include a lane marking data collector 202 for collecting data regarding lane markings on roadway 101, a first image processor 210 to prepare lane marking data for further processing and analysis, a lane marking detection module 212 to detect lane markings 132, 134, 136 in a roadway environment, and a lane marking categorization module 214 to categorize lane markings 132, 134, 136.

Lane identification system 200 also includes certain components for detecting and analyzing signs, including, but not limited to exit signs and turn signs. These components include an sign data collector 204 for collecting data regarding signs on roadway 101, a second image processor 216 to prepare sign data for further processing and analysis, a sign detection module 218 to detect signs (e.g., 140, 142) in a roadway environment, and a sign analyzer 220 to identify characteristic features of signs (e.g., 140, 142), including but not limited to, text, arrows, symbols, and other visual indicia.

Finally, lane identification system 200 includes an identification module 222 that identifies and locates exit-only and shared exit lanes. Identification module 222 accepts data from lane marking categorization module 214 and sign analyzer 220. Based on that data, identification module 222 identifies the presence and location of exit-only and shared exit lanes. The operation of identification module 222 will be discussed in more detail in connection with FIGS. 3A-B.

Lane marking data collector 202 may include one or more cameras capable of capturing image data within a field of view surrounding vehicle 110. Generally, the field of view of lane marking data collector 202 may be sufficient to capture image data for lane markings on roadway 101 in front of and peripheral to vehicle 110. Similarly, sign data collector 204 may include one or more cameras capable of capturing image data within a field of view surrounding vehicle 110. Generally, the field of view of sign data collector 204 may be sufficient to capture image data for signs appearing in front of, above, and peripheral to vehicle 110. Although the illustrative embodiment of FIG. 1 depicts overhead exit signs 140, 142, it should be understood that the present disclosure is not limited to detection of overhead exit signs, and may also include detection and analysis of signage appearing roadside at or near street-level. Also, as discussed in greater detail below in connection with FIG. 11, a vehicle (e.g., 110) that includes lane identification system 200 may also have communications that allow the vehicle to communicate and receive updated lane marking data and sign data to allow or assist the vehicle to detect and identify signs and lane markings. For example, in an illustrative embodiment, the vehicle's 110 navigation system 206 may transmit a current GPS coordinate that may indicate that the vehicle 110 is entering another state or country. As different geographic regions may have differences and/or variances in lane markings and sign graphics, the communications of the vehicle may receive from a remote server over a network, updated lane marking and sign data that may be stored in one or more vehicle databases (e.g., 213, 219) for subsequent lane marking and sign data detection.

FIG. 2 shows lane marking data collector 202 and sign data collector 204 as separate components, but other embodiments may include a single data collector that captures both lane marking data and sign data. For example, FIGS. 4A-5C, to be described in more detail below, show exemplary image data from a single data collector that serves as both a lane marking data collector 202 and an exit sign data collector 204. Other embodiments may use cameras located at different positions. For example, the cameras may be mounted elsewhere on front hood of vehicle 110, on sides of vehicle 110, inside vehicle 110 mounted near its front windshield, or in any other location suitable for capturing image data of the proximity of vehicle 110. Still other embodiments may use other types of data collectors (e.g., radar or lidar) in addition to or as alternatives to cameras.

Data from lane marking data collector 202 is transmitted to first image processor 210. First image processor 210 may perform image pre-processing to facilitate lane marking detection and analysis. For example, first image processor 210 may extract frames of image data from lane marking data collector 202 and apply image processing filters to adjust and enhance image properties (e.g., brightness, contrast, edge enhancement, noise suppression, etc.). First image processor 210 may also perform perspective transformations, such that lane identification system 200 can analyze identified lane markings from a top-down, plan perspective, rather than from a front perspective. First image processor 210 then transmits pre-processed frames of image data to lane marking detection module 212.

Lane marking detection module 212 may detect and identify lane markings from within the pre-processed frames of image data. Generally, lane markings on roadways are often painted white, such that the pixel intensity for portions of the image data corresponding to lane markings may sharply differ from the pixel intensity of other portions of the image data. Such differences give rise to discontinuities, near-discontinuities, or sharp gradients in pixel intensity at locations in the image data corresponding to lane markings. This allows lane marking detection module 212 to identify candidate lane markings through a variety of techniques, including edge-detection techniques, ridge-detection techniques, or other feature extraction and identification methodologies.

Upon detection of candidate lane markings, lane marking detection module 212 can perform additional steps to determine whether candidate lane markings are actual lane markings rather than false positives. For example, lane marking detection module 212 can compute slopes of candidate lane markings to determine whether the slopes are consistent with what would be expected of actual lane markings, and can compare image data among several consecutive frames to determine whether the relative position of candidate lane markings among those frames is consistent with what would be expected of actual lane markings.

Figure 4A:
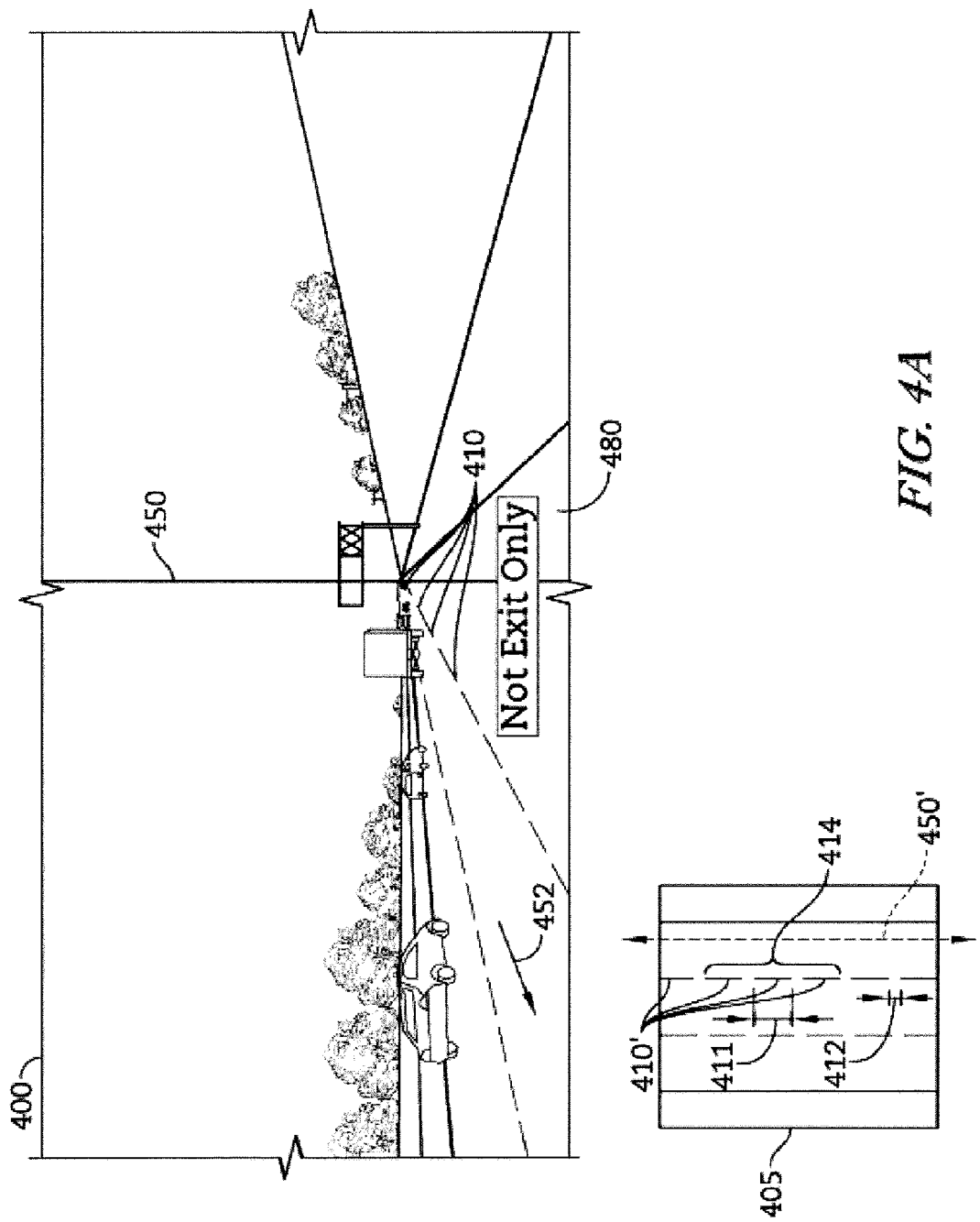
FIG. 4A shows exemplary image data captured by an identification system and an exemplary output of a lane marking detection module in accordance with the present disclosure, and suggests that the lane identification system has detected standard frequency lane markings on a left side of the vehicle.

FIG. 4A, to be discussed in more detail below, illustrates an exemplary result of the processing described above. In particular, FIG. 4A shows a frame of image data 400 captured by lane marking data collector 202, and retrieved by first image processor 210. FIG. 4A also shows an exemplary output 405 of lane marking detection module 212. As shown, captured frame of image data 400 includes lane markings 410, and output 405 from lane marking detection module 212 shows detected lane markings 410'.

Returning to FIG. 2, the detected lane markings are transmitted to lane marking categorization module 214. Lane marking categorization module 214 categorizes the detected lane markings based both on lane marking type and based on the side of vehicle 110 on which the detected lane markings appear. As explained in connection with FIG. 1, exemplary lane marking types include standard frequency, high frequency, and solid lane markings. Such lane markings may appear on a left side or a right side of vehicle 110.

To categorize detected lane markings based on lane marking type, lane marking categorization module 214 may compute and analyze lengths and/or frequencies of detected lane markings. For example, FIG. 4A shows detected lane markings 410', which are standard frequency lane markings. Lane marking categorization module 214 may determine pixel-based dash lengths 411 of each of the detected lane markings 410' and/or pixel-based gap lengths 412 of gaps between each of the detected lane markings 410'. Lane marking categorization module 214 may be pre-programmed with dash length or gap length thresholds. Lane marking categorization module 214 may determine that detected lane markings 410' are standard frequency if dash lengths 411 are above a predetermined length threshold, if gap lengths 412 are above a predetermined gap length threshold, or based on a combination of these assessments. Alternatively, lane marking categorization module 214 may assess a relative frequency of detected lane markings 410', such as how many detected lane markings 410' (i.e., how many dashes) exist within a predetermined range 414. If the determined relative frequency is below a predetermined frequency threshold, lane marking categorization module 214 may determine that detected lane markings 410' are standard frequency.

FIG. 4C shows detected lane markings 424' that are high frequency. As illustrated, dash lengths 421 and gap lengths 422 of detected lane markings 424' are smaller as compared to detected lane markings 410' of FIG. 4A, and may fall below the above-referenced predetermined dash length and gap length thresholds. Also, the number of detected lane markings 424' (i.e., the number of dashes) within a predetermined range 426 may be higher than the above-referenced predetermined frequency threshold. Any one or more of these factors could be used by lane marking categorization module 214 to conclude that detected lane markings 424' are high frequency.

Figure 4B:
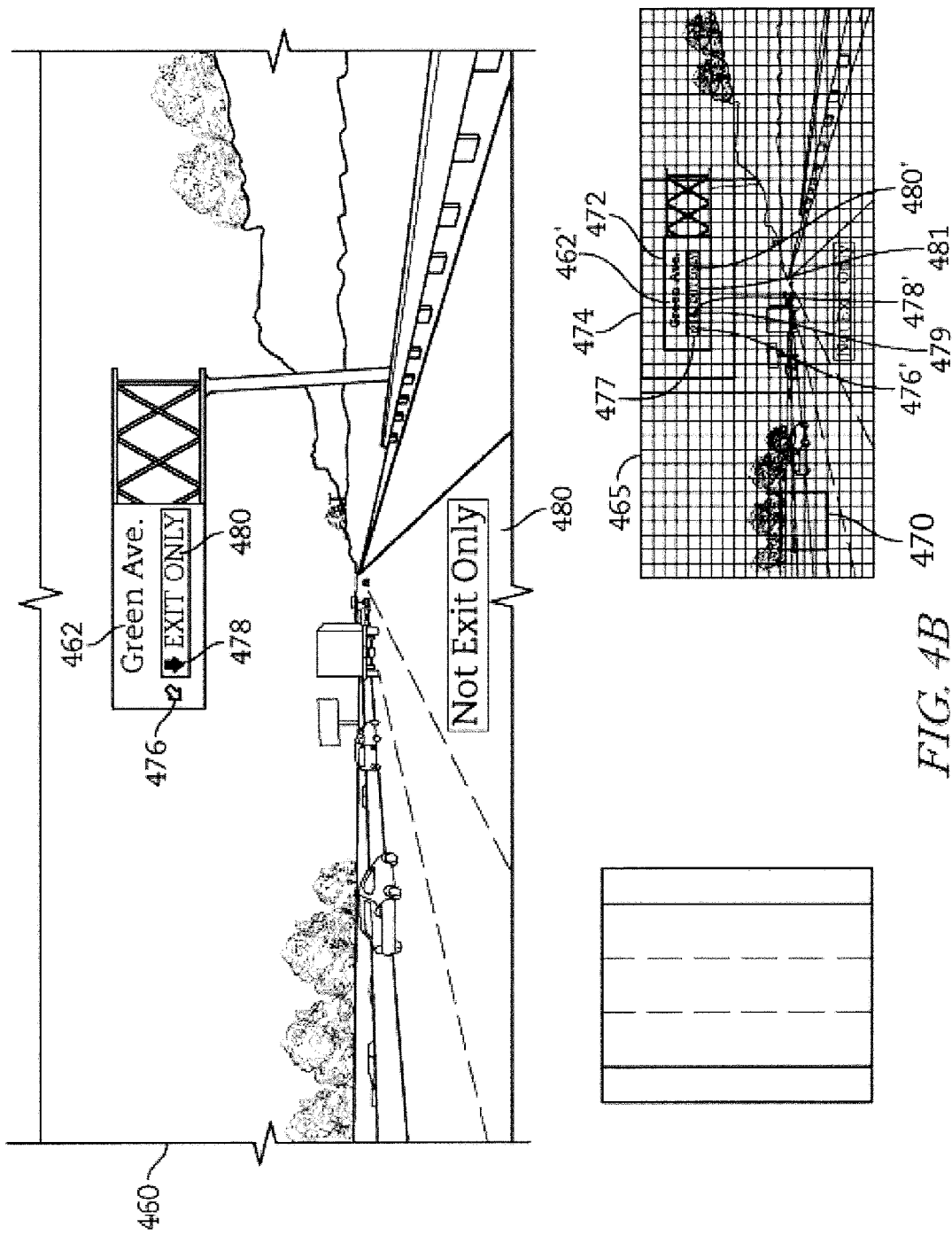
FIG. 4B shows exemplary image data captured by a lane identification system and an exemplary output of an exit sign analyzer in accordance with the present disclosure, and suggests that the lane identification system has detected an exit sign, as well as text and two arrows on the exit sign that indicate the presence of one exit-only lane and one shared exit lane.
Figure 4D:
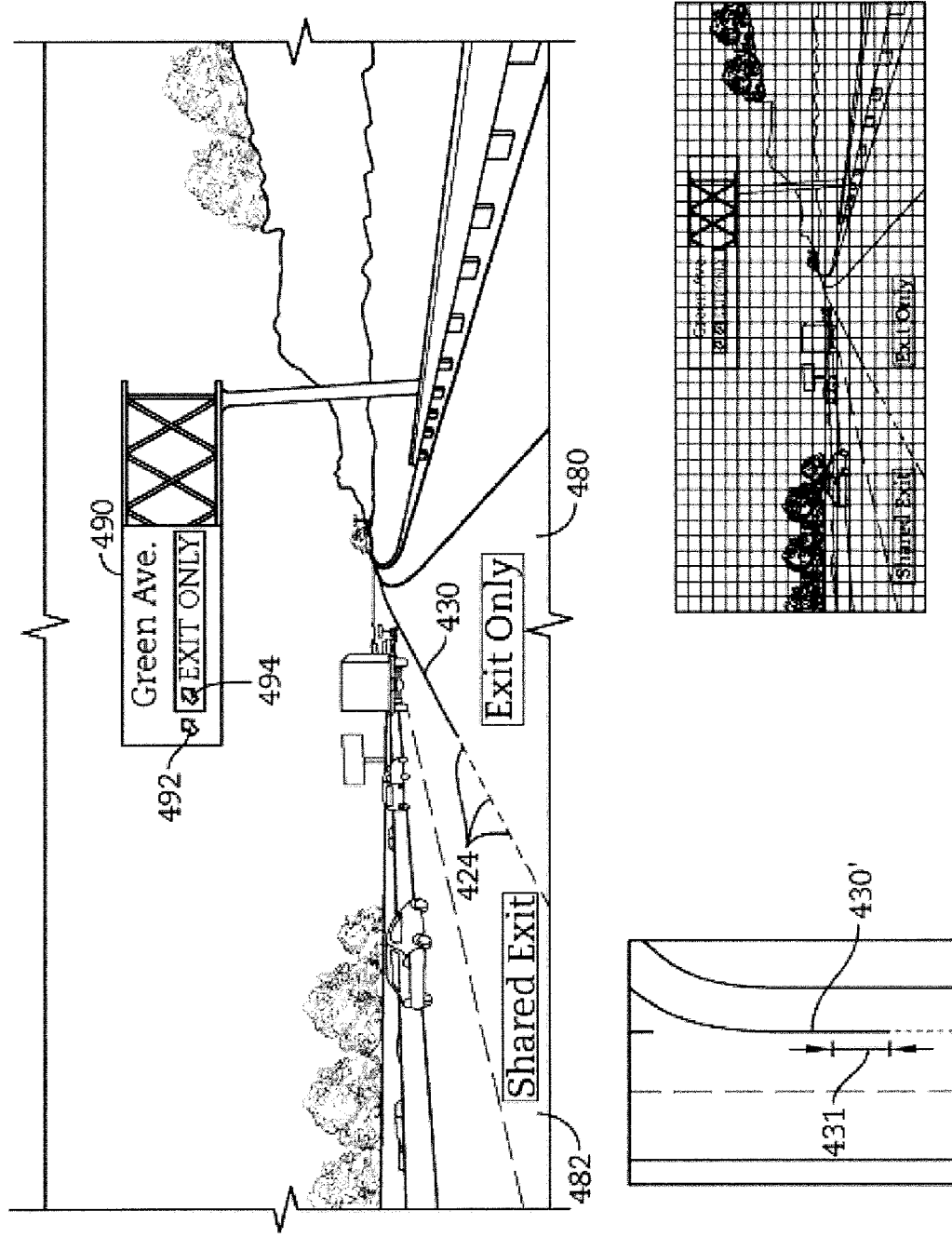
FIG. 4D shows exemplary image data captured by a lane identification system, an exemplary output of a lane marking detection module, and an exemplary output of an exit sign analyzer in accordance with the present disclosure, and suggests that the lane identification system has detected a transition in lane markings on the left side of the vehicle from high frequency lane markings to solid lane markings, and has also detected an exit sign that includes text and two arrows, which confirm that the presently occupied lane of the vehicle is exit-only and the neighboring left lane of the vehicle is shared.

FIG. 4D shows detected lane marking 430', which is a solid lane marking. Lane marking categorization module 214 may conclude that detected lane marking 430' is solid by assessing whether detected lane marking 430' proceeds beyond a predetermined length threshold 431 without a gap.

Thus, as explained, lane marking categorization module 214 categorizes detected lane markings based on type, which may include standard frequency, high frequency, and solid. These types are merely exemplary. Other roadway settings may use other types of lane markings to signify exits, exit-only lanes, or shared exit lanes. Lane marking categorization module 214 may be programmed to categorize detected lane markings into any categories appropriate for lane marking conventions of a given roadway setting. For example, lane marking categorization module 214 may be in communication with a database 213 that contains sample lane marking data organized based on category. Lane marking categorization module 214 may apply statistical comparison and classification techniques to categorize detected lane markings under analysis as belonging to one of the categories stored in database 213. By reconfiguring and reprogramming database 213 with different types of sample data associated with different categorization conventions, lane marking categorization module 214 can be purposed for any lane marking conventions being used in a given roadway setting.

Returning to FIG. 2, lane marking categorization module 214 also categorizes lane markings based on whether detected lane markings are on the left side or right side of vehicle 110. Such a determination may be made, for example, by forming an axis aligned with the directional orientation of vehicle 110. For example, FIG. 4A shows an axis 450 that aligns with the directional heading of vehicle 110. Lane marking categorization module 214 may overlay a corresponding axis 450' on output 405, determine that detected lane markings 410' are to the left of corresponding axis 450', and conclude that lane markings 410 are on a left side of vehicle 110.

Alternatively, lane marking categorization module 214 may determine whether detected lane markings are to the left or to the right of vehicle 110 based on trajectory analysis. As vehicle 110 progresses, detected lane markings will appear in differing locations in subsequent frames of captured image data. Lane marking categorization module 214 may recognize and track a given detected lane marking over the course of multiple frames using any suitable object tracking techniques (e.g., Kalman filtering). If a tracked lane marking trends down and towards the left over the course of subsequent captured frames of image data 400, as suggested by arrow 452 of FIG. 4A, lane marking categorization module 214 may conclude detected lane markings are to the left of vehicle 110. If detected lane markings trend down and towards the right over the course of subsequent captured frames of image data 400, lane marking categorization module 214 may conclude detected lane marking are to the right of vehicle 110.

Lane marking categorization module 214 then transmits the categorization of detected lane markings to identification module 222. In this illustrative example, the categorizations may include standard frequency lane markings on left side, standard frequency lane markings on right side, high frequency lane markings on left side, high frequency lane markings on right side, solid lane markings on left side, and solid lane markings on right side. Identification module 222 combines these categorizations with data received from exit sign analyzer 220 (to be discussed below) and determines the presence and location of exit-only and shared exit lanes (to be discussed below).

As explained, in addition to lane marking data, lane identification system 200 also collects and processes exit sign data. Second image processor 216, which may be the same or a different component than first image processor 210, retrieves captured frames of image data from sign data collector 204. Second image processor 216 may perform image pre-processing to facilitate sign detection and analysis, including to apply image processing filters to adjust and enhance image properties (e.g., brightness, contrast, edge enhancement, noise suppression, etc.) and/or perform perspective transformations. Second image processor 216 then transmits pre-processed frames of image data to sign detection module 218.

Sign detection module 218 detects signs within the pre-processed frames of image data using any suitable object detection, recognition, and classification methodology. For example, FIG. 4B shows an exemplary output 465 that depicts results of sign detection module 218. Output 465 is based on an exemplary frame of image data 460 that includes an exit sign 462. Sign detection module 218 may perform pixel-based segmentation of output 465 into subwindows, and perform object detection and recognition using subwindowing schemes, such as sliding window detection. By way of example, sign detection module 218 may iterate through a variety of subwindows of varying sizes and dimensions. For each subwindow, sign detection module 218 may perform classification to determine whether that subwindow contains an exit sign or turn-only sign. The classification can be based on statistical object detection and recognition methodology. Sample data for the classification, including exemplary image data both containing exit signs and not containing exit signs, may be provided as part of a database 219. For each subwindow at hand, sign detection module 218 can perform a classification to form a conclusion regarding whether that subwindow has an exit sign.

FIG. 4B shows, by way of example, an exemplary subwindow 470 that does not contain a sign. Subwindow 472, however, was classified as containing a detected exit sign 462'. In certain implementations, sign detection module 218 may identify a subwindow, such as subwindow 474, as containing a detected exit sign 462' and perform additional processing to identify a smaller subwindow 472 containing detected exit sign 462', as to more accurately identify its location.

Once sign detection module 218 identifies detected exit sign 462', it transmits data for detected exit sign 462' to sign analyzer 220. Sign analyzer 220 performs additional analysis to detect characteristics of exit sign 462. Characteristics may include symbols, such as arrows or text appearing on exit sign 462. Sign analyzer 220 may use similar object detection, recognition, and classification techniques as used by sign recognition module 218, and database 219 may include additional sample data for this purpose.

In the example of FIG. 4B, sign analyzer 220 performs additional pixel-based segmentation and windowing of output 465 and consults database 219 to identify arrows 476, 478 and "EXIT ONLY" text 480. Database 219 may include sample image data of arrows and sample image data of "EXIT ONLY" text, against which exit sign analyzer 220 can perform statistical classification of various subwindows. As illustrated, exit sign analyzer 220 has identified subwindows 477 and 479 as containing detected arrows 476' and 478', respectively, and subwindow 481 as containing detected "EXIT ONLY" text 480'.

In addition to identifying arrows 476 and 478, sign analyzer 220 may also identify characteristics of arrows 476 and 478, as well as other symbols and/or visual indicia, including their orientation and color. As previously explained, arrow orientation may signify whether an exit is impending, and arrow color may signify whether corresponding lanes are exit-only or shared. To determine orientation, sign analyzer 220 may again use statistical object recognition and classification, for which purpose database 219 may include sample image data and corresponding classifications of arrows assuming the different configurations of interest (e.g., generally downwards pointing arrows, generally upwards pointing arrows, etc.). To determine color, sign analyzer 220 may analyze pixel-based intensities. In this illustrative embodiment, sign analyzer 220 solely determines whether a given arrow is black or white, such that monochrome intensity is sufficient. In other embodiments, sign analyzer 220 may analyze pixel-based intensity according to a color model (e.g., RGB, CMYK, etc.). In the example of FIG. 4B, arrows 476, 478 are detected as generally downwards pointing, arrow 476 is detected as white, and arrow 478 is detected as black. In other illustrative embodiments, sign analyzer 220 may detect other colors, such as red, yellow and green.

Sign analyzer 220 transmits its analysis of detected signs to identification module 222. Exemplary information transmitted by sign analyzer 220 may include, for each detected sign, the number, color, orientation, and position of arrows and other visual indicia of the detected sign, and the presence and position of text (e.g., "EXIT ONLY") on the sign.

Figure 3A:
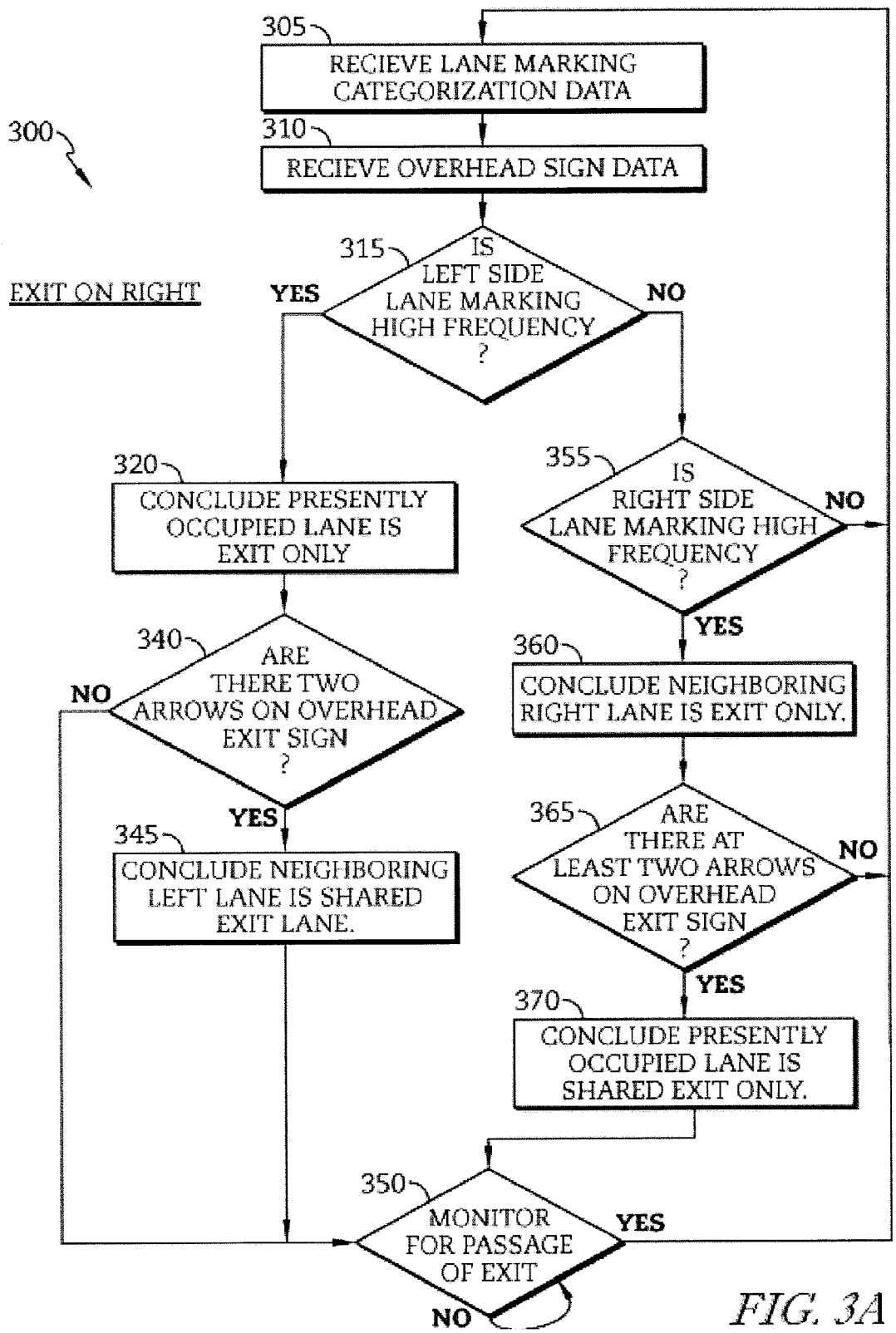
FIG. 3A is a flow diagram illustrating a methodology for operating an identification system in accordance with the present disclosure in which an exit departs a roadway on the right.

As explained, identification module 222 determines the existence and location of exit-only and shared exit lanes based on lane marking and sign data. FIG. 3A shows an exemplary method of operation 300 of identification module 222. The illustrated method of operation 300 applies where an exit departs from a roadway on the right. A modified method, to be explained below, may apply where an exit departs from a roadway on the left. Lane identification system 200 may receive an indication of which of these situations applies from navigation system 206, which may include GPS or other position tracking technology and notify lane identification system 200 that an exit or intersection is approaching, along with an indication of which side of the roadway the exit will depart from.

Alternatively, lane identification system 200 may determine which side of the roadway an exit will depart based on exit signs, with exit signs on a right side of a roadway suggesting an exit departing from the right, and exit signs on a left side of a roadway suggesting an exit or turn departing from the left. Other possibilities include analysis of the orientation of arrows on detected exit signs, with arrows pointing towards the right suggesting that an exit will depart on the right and arrows pointing towards the left suggesting that an exit will depart on the left. As still another alternative, lane identification system 200 may use lane markings to determine which side of the roadway an exit will depart. Using the example of FIG. 1, lane identification system 200 of vehicle 110 may detect a solid lane marking 180 signifying a roadway boundary on a right side and detect lane markings for several lanes 104, 105, 106 on a left side. Lane identification system 200 may thereby conclude that lane 103 is on a right-hand side of roadway 101, and that exit 107 will therefore depart from the right.

The method of operation 300 begins with receiving operations 305, 310 in which identification module 222 receives lane marking categorizations from lane marking categorization module 214 and exit sign analysis from exit sign analyzer 220. In operation 315, identification module 222 determines whether high frequency lane markings are on the left side of vehicle 110. If so, identification module 222 proceeds to operation 320, in which it concludes that the presently occupied lane of vehicle 110 is exit-only.

Identification module 222 may then take one or more actions, depending on how lane identification system 200 is being used in vehicle 110. For example, identification module 222 may notify the driver of vehicle 110 that vehicle 110 is in an exit-only lane. If in an exit-only lane, the driver may wish to resume control of vehicle 110, and then at a later, desired time pass control back to autonomous driving system 208. Alternatively, identification module 222 may notify autonomous driving system 208 that vehicle 110 is in an exit-only lane. Autonomous driving system 208 may then take appropriate action. Autonomous driving system 208 may factor the notification from identification module 222 as it follows navigation instructions it receives from navigation system 206. Thus, based on whether navigation system 206 indicates that vehicle 110 should be taking an upcoming exit/turn, autonomous driving system 208 may determine whether it should allow vehicle 110 to remain in its present exit-only lane, or change lanes to avoid taking an exit.

In addition to determining that the presently occupied lane is exit-only, identification module 222 also determines whether there exists a shared exit lane. In operation 340, identification module 222 determines whether received exit sign analysis indicates the presence of a shared exit. For example, if received exit sign analysis indicates there are two arrows on a detected exit sign, one black and one white, identification module 222 may conclude, based on the existence of a white arrow, that there is a shared exit lane. Additional examples for how identification module 222 may conclude whether there exists a shared exit lane will be discussed in connection with FIGS. 7A-F.

Identification module 222 may then proceed to operation 345, in which it concludes that the neighboring left lane of vehicle 110 is a shared exit. In response to such a conclusion, identification module 222 may take appropriate action, such as to notify autonomous driving system 208, which can factor this information into its driving decisions.

On the other hand, returning to operation 315, if identification module 222 determines that lane markings on the left side of vehicle 110 are not high frequency, then the presently occupied lane of vehicle 110 would not be exit-only. Identification module 222 may proceed to operation 355, in which it determines whether lane markings on the right side of vehicle 110 are high frequency. If not, then identification module 222 determines there are no upcoming exit-only or shared exit lanes, and returns to receiving operations 305, 310 to analyze subsequently received data.

If identification module 222 determines that lane markings on the right side of vehicle 110 are high frequency lane markings, it may proceed to operation 360, in which it concludes that a neighboring right lane of vehicle 110 is exit-only. Identification module 222 may then take appropriate action, such as to notify autonomous driving system 208. Autonomous driving system 208 may take appropriate action. For example, if navigation system 206 instructs autonomous driving system 208 to take the upcoming exit, autonomous driving system 208 may change into the neighboring exit-only lane.

Identification module 222 may proceed to check for the presence of a shared exit lane. In operation 365, identification module 222 determines whether received exit sign analysis indicates the presence of a shared exit. For example, if received exit sign analysis indicates there are two arrows on a detected exit sign, one black and one white, identification module 222 may conclude, based on the existence of a white arrow, that there is a shared exit lane. Additional examples for how identification module 222 may conclude whether there exists a shared exit lane will be discussed in connection with FIGS. 7A-F.

In operation 370, identification module 222 may conclude that the presently occupied lane of vehicle 110 is a shared exit lane. Identification module 222 may then take appropriate action, such as to notify the driver of vehicle 110 or to notify autonomous driving system 208. As explained, autonomous driving system 208 may provide the driver of vehicle 110 with the ability to assume control of vehicle 110. Alternatively, autonomous driving system 208 may determine whether staying in a shared exit lane is in accordance with instructions received from navigation system 206.

If identification module 222 identified any lane as an exit-only or shared exit lane, identification module 222 may proceed to monitoring operation 350, which monitors for the passage of an exit. Once an exit passes, then the prior identifications of exit-only or shared exit lanes would become obsolete, and identification module 222 returns to receiving operations 305, 310 to analyze subsequently received data. Identification module 222 may determine that an exit passes through a number of alternative approaches. In one example, identification module 222 may use exit sign analysis, with signs having a generally upwards orientation of arrows indicating that an exit is imminently passing. Identification module 222 may also determine that an exit passes through lane marking analysis. For example, when lane markings return to standard frequency, identification module 222 may conclude that an exit has passed.

Other methodologies for detecting exits through lane markings are discussed in U.S. patent application Ser. No. 14/520,804, entitled ACCURATE POSITION DETERMINATION NEAR EXIT LANES, filed on Oct. 22, 2014, which is hereby incorporated by reference in its entirety.

In exemplary operations not depicted in FIG. 3A, identification module 222 may confirm the accuracy of any of its determinations with additional operations. For example, identification module 222 may await information from lane marking categorization module 214 indicating a transition from high frequency lane markings to solid lane markings, which would indicate that an exit is impending and may confirm prior determinations of the presence of an exit-only lane. As another example, identification module 222 may receive sign data from sign analyzer 220 indicating the presence of a sign containing exit arrows or text (e.g., "EXIT ONLY"), which may also confirm prior determinations of the presence of an exit-only lane.

As explained, the exemplary method of operation 300 depicted in FIG. 3A applies to the situation in which an approaching exit departs a roadway on the right side of the roadway. Lane identification system 200 may instead operate in the situation where an exit departs on the left. The methodology for such a circumstance would be similar, but with adjustments to certain operations reflecting that conclusions drawn based on the side of the vehicle on which characteristic lane markings were detected should be flipped.

Figure 3B:
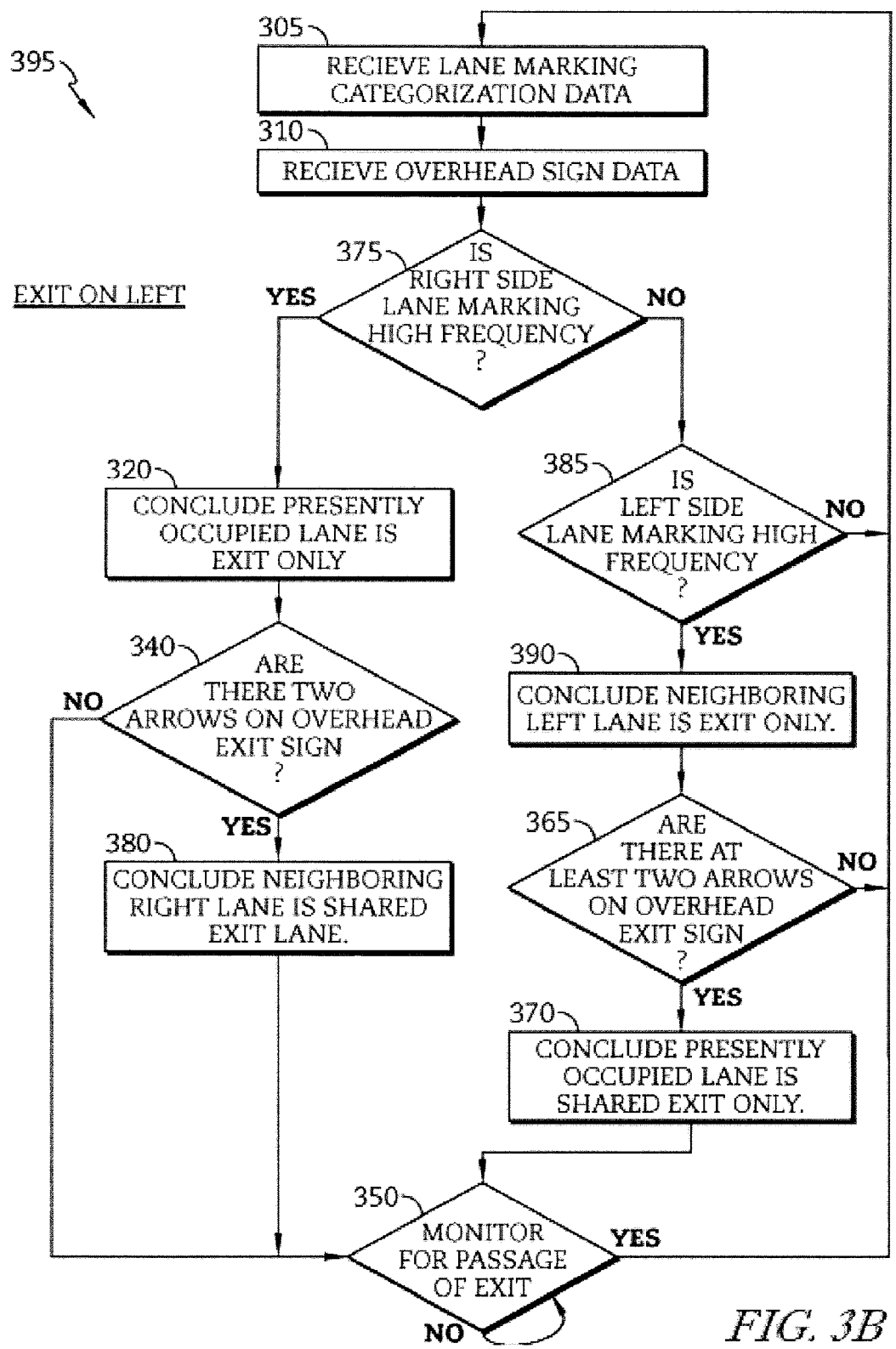
FIG. 3B is a flow diagram illustrating a methodology for operating an identification system in accordance with the present disclosure in which an exit departs a roadway on the left.

FIG. 3B illustrates a methodology 395 for operating a lane identification system in a situation in which an exit departs on the left. Many operations are similar to correspondingly numbered operations depicted in FIG. 3A. Operations 375, 380, 385, and 390, however, differ from corresponding operations depicted in FIG. 3A in that the relevant directional orientation used in decision-making has been switched, as appropriate for a situation in which an exit departs on the left.

FIGS. 4A-4D illustrate an exemplary usage scenario of lane identification system 200 for a vehicle traveling in an exit-only lane. In FIG. 4A, lane identification system 200 detects lane markings 410 as standard frequency, and concludes that presently occupied lane 480 is not exit-only. In FIG. 4B, lane identification system 200 detects lane markings 410 as standard frequency, and thus continues to conclude that presently occupied lane 480 is not exit-only. However, lane identification system 200 detects an exit sign 462 that includes two arrows 476, 478. Arrow 476 is analyzed to be white in color, while arrow 478 is analyzed to be black in color. This indicates to lane identification system 200 that an exit may be approaching, for which there may be an exit-only lane and a shared exit lane.

In FIG. 4C, lane identification system 200 detects high frequency lane markings 424 on the left side. In response to detecting high frequency lane markings 424 on the left side, lane identification system 200 concludes that presently occupied lane 480 is exit-only. Moreover, because lane identification system 200 previously identified an exit sign 462 indicating there would be both an exit-only lane and a shared exit lane, lane identification system 200 determines that neighboring left lane 482 is a shared exit.

In FIG. 4D, lane identification system 200 detects a transition from high frequency lane markings 424 to solid lane marking 430 on the left side, which may confirm that an exit is approaching and that presently occupied lane 480 is exit-only. In addition, lane identification system 200 detects an exit sign 490 with two arrows 492, 494, which may also confirm that an exit is approaching, and that presently occupied lane 480 is exit-only and that neighboring left lane 482 is a shared exit.

Figure 5A:
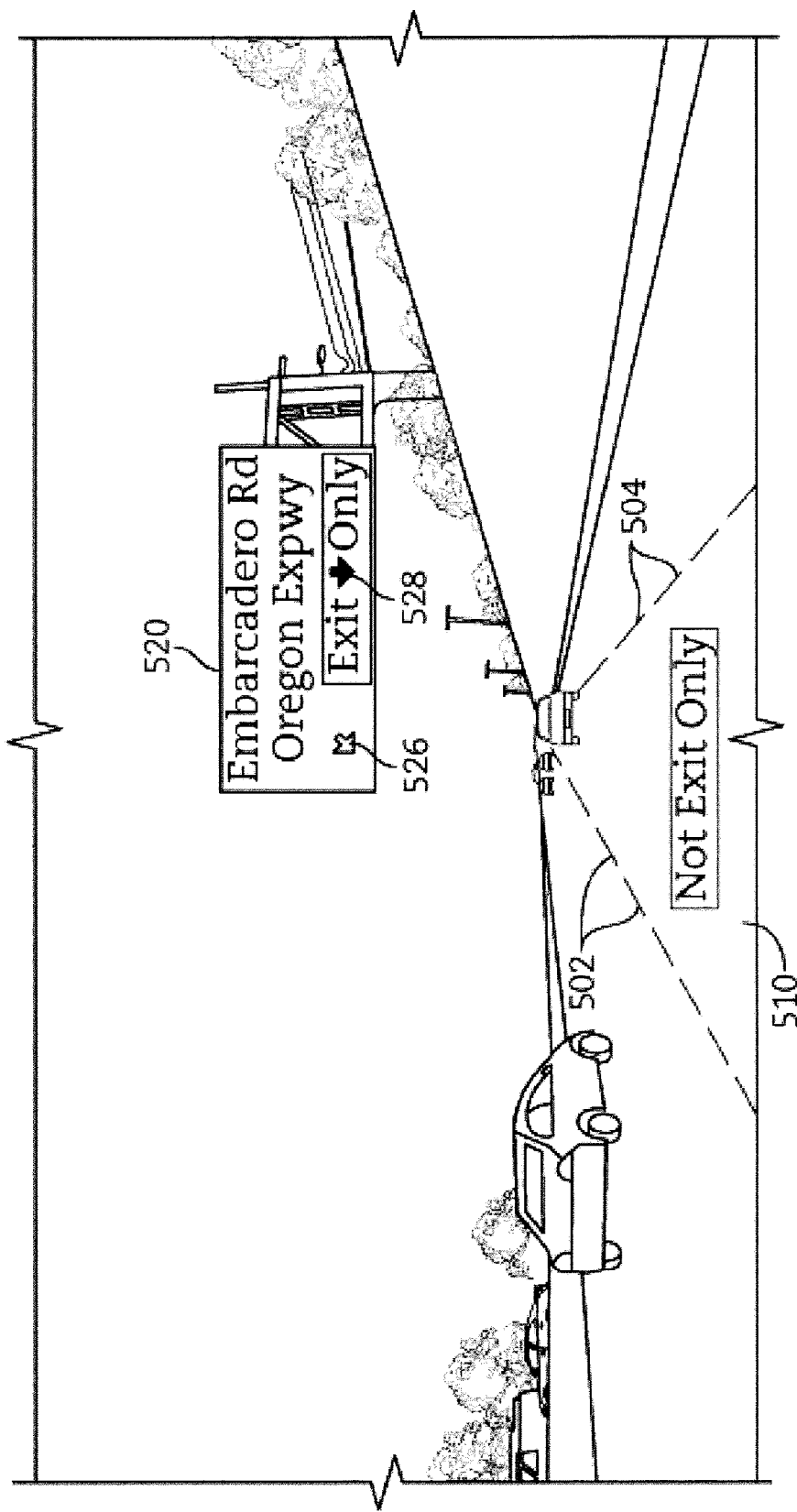
FIG. 5A shows exemplary image data captured by a lane identification system similar to that of FIG. 4A, except that the lane identification system is mounted on a vehicle in a shared exit lane, and suggests that the lane identification system has detected an exit sign that includes text and two arrows, indicating the presence of both an exit-only lane and a shared exit lane.
Figure 5B:
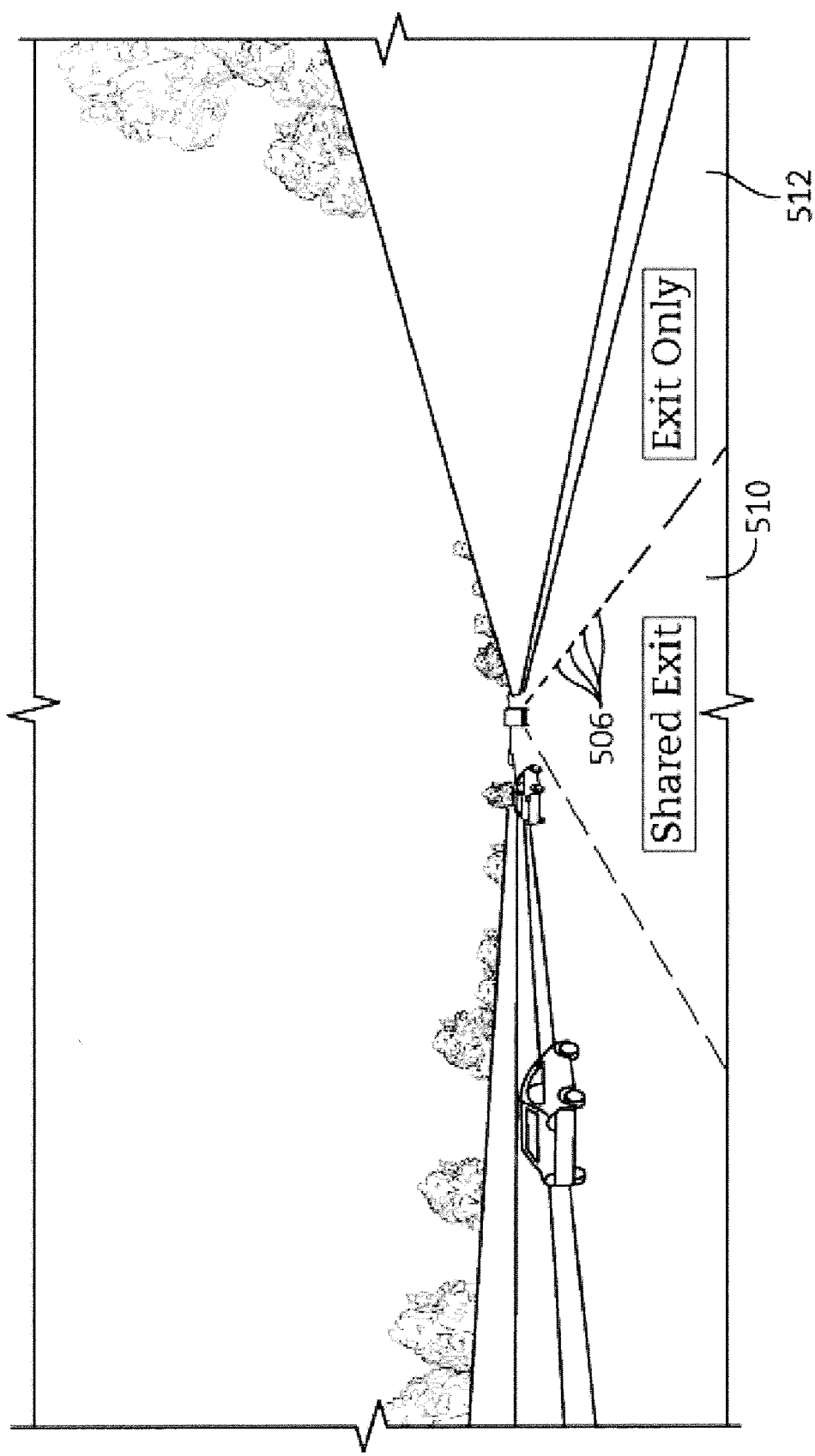
FIG. 5B shows exemplary image data captured by a lane identification system in accordance with the present disclosure, and suggests that the lane identification system has detected a transition in lane markings on the right side of the vehicle from standard frequency lane markings to high frequency lane markings, indicating that the neighboring right lane is an exit-only lane and the presently occupied lane is a shared exit lane.
Figure 5C:
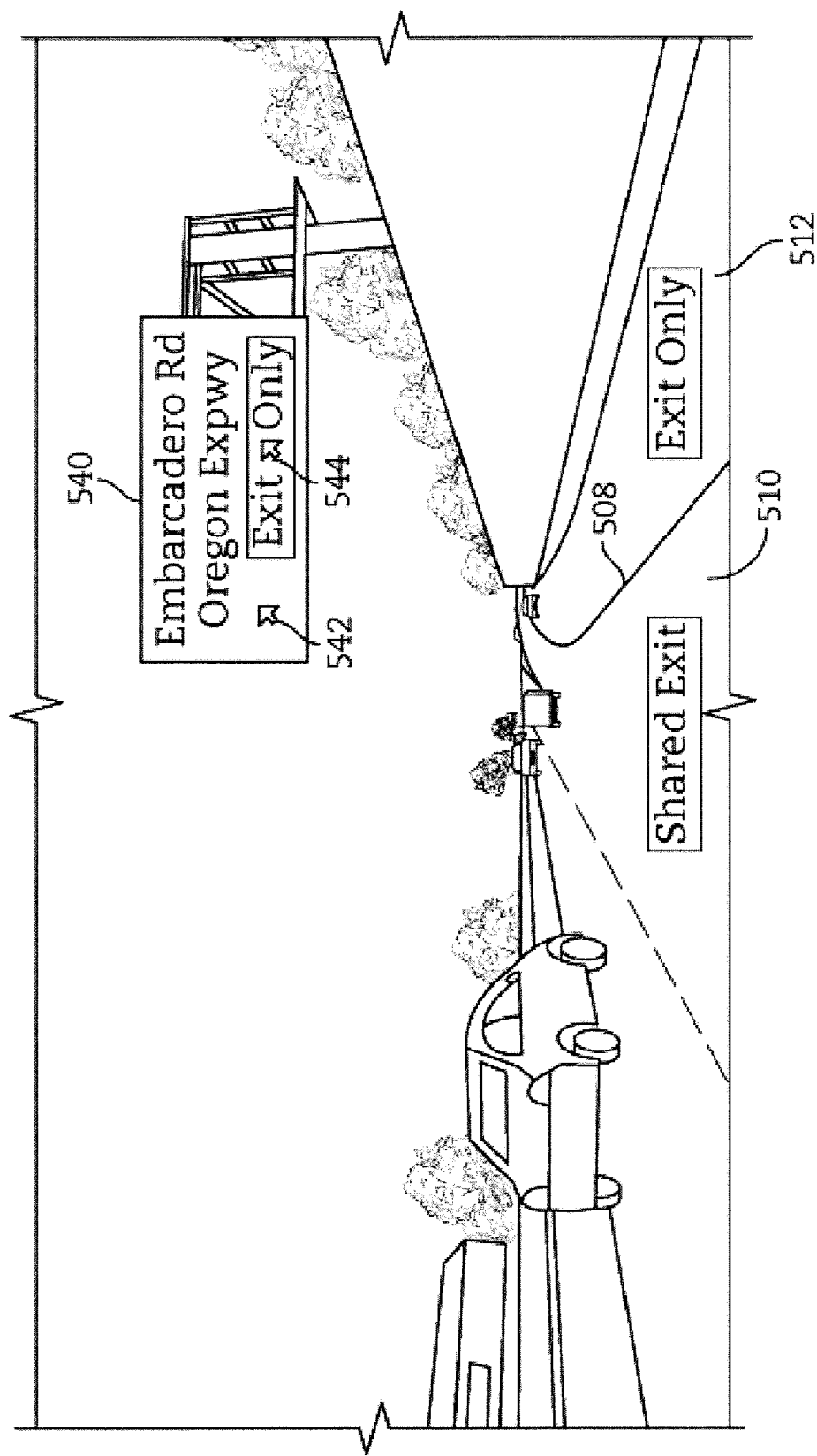
FIG. 5C shows exemplary image data captured by a lane identification system in accordance with the present disclosure, and suggests that the lane identification system has detected a transition in lane markings on the right side of the vehicle from high frequency lane markings to solid lane markings, and has also detected an exit sign including text and two arrows on the exit sign, which confirm that the neighboring right lane is an exit-only lane and the presently occupied lane of the vehicle is a shared exit lane.

FIGS. 5A-5C depict an exemplary usage scenario of lane identification system 200 for a vehicle that travels on a shared exit lane. In FIG. 5A, lane identification system 200 detects standard frequency lane markings 502, 504 on left and right sides. In response, lane identification system 200 determines that presently occupied lane 510 is not exit-only. In addition, lane identification system 200 detects an exit sign 520 with two arrows 526, 528. Arrow 526 is analyzed to be white in color, while arrow 528 is analyzed to be black in color. This indicates to lane identification system 200 that an exit may be approaching, for which there may be an exit-only lane and a shared exit lane.

In FIG. 5B, lane identification system 200 detects high frequency lane markings 506 on the right, indicating that neighboring right lane 512 is exit-only. In addition, because lane identification system 200 previously detected exit sign 520 as indicating there would be both an exit-only lane and a shared exit lane, lane identification system 200 determines that presently occupied lane 510 is a shared exit. In FIG. 5C, lane identification system 200 detects a transition from high frequency lane markings 506 on the right to solid lane markings 508 on the right. Lane identification system 200 further detects exit sign 540 with two arrows 542, 544. These detections may confirm that an exit is impending, that neighboring right lane 512 is exit-only, and that presently occupied lane 510 is a shared exit.

As explained, a benefit of lane identification system 200 is that determinations of exit-only lanes and shared lanes may be communicated to autonomous driving system 208 to improve autonomous driving performance. FIGS. 6A-B illustrate an exemplary benefit of notifying autonomous driving system 208 that a presently occupied lane is a shared exit. FIG. 6A shows a roadway 600 with an exit 660, on which a vehicle 610 occupies a lane 602. Vehicle 610 is equipped with an autonomous driving system (not pictured), but is not equipped with lane identification system 200.

The autonomous driving system maintains vehicle 610 within lane 602 by centering vehicle 610 between left side and right side lane markings 606, 608. However, lane 602 is a shared exit, meaning its right side lane marking 608 will diverge and exit from roadway 600. Vehicle 610 is not equipped with lane identification system 200, meaning its autonomous driving system is not aware that lane 602 is a shared exit. As such, it continues to center vehicle 610 between left side and right side lane markings 606, 608. Vehicle 610 begins to drift towards the right, and may fall off the roadway 600 or crash into median 614.

FIG. 6B, in contrast, shows a vehicle 650 equipped with lane identification system 200. Lane identification system 200 identifies lane 602 as a shared exit, and detects transition 616 where right side lane marking 608 changes from high frequency to solid, indicating that an exit is impending. Lane identification system 200 may notify autonomous driving system 208 that lane 602 is a shared exit and that an exit is impending. In response, autonomous driving system 208 may ignore right side lane marking 608. Instead, autonomous driving system 208 may seek to maintain a fixed position relative solely to left side lane marking 606. Upon passage of the exit 660, autonomous driving system 208 may continue positioning vehicle 650 based on both left side and right side lane markings 606, 608.

As explained, lane identification system 200 may analyze detected signs, such as exit and turn signs for characteristics indicating the presence of exit-only and shared exit lanes. A variety of exit and turn signs with respective types of characteristics are within the scope of the present disclosure. Generally, the types of exit/turn signs, the characteristics of exit/turn signs, and the meaning of those characteristics may vary based on signage conventions used in any given roadway setting. Lane identification system 200 may be configured to recognize and interpret any such signs.

FIGS. 7A-F show additional examples of exit signs that may be analyzed by lane identification system 200 in accordance with the present disclosure. FIG. 7A shows an exit sign 710 that may appear in advance of an exit, such as approximately half a mile before an exit. Exit sign 710 includes only one arrow 712, which is black in color and appears within "EXIT ONLY" text box 714. Lane identification system 200 may analyze exit sign 710 to determine that an exit is approaching for which there will be one exit-only lane, and no shared exit lanes. Lane identification system 200 may determine there will be one exit-only lane because there is only one arrow 712, because arrow 712 is colored black, and/or because arrow 712 is located within "EXIT ONLY" text box 714.

FIG. 7B shows an exit sign 720 that corresponds to the same exit as exit sign 710, but that appears immediately before the exit. Exit sign 720 includes only one arrow 722, from which lane identification system 200 may confirm that there is one exit-only lane and no shared exit lanes. Moreover, arrow 722 is rotated upwards and to the right, from which lane identification system 200 may confirm that an exit is impending.

FIG. 7C shows an alternative exit sign 730 with two arrows 732, 734 that may appear in advance of an exit, such as approximately half a mile before an exit. Arrow 732 is white in color, while arrow 734 is black in color and located within "EXIT ONLY" text box 736. Lane identification system 200 may analyze exit sign 730 and determine that an exit is approaching for which there will be one exit-only lane and one shared exit lane. Lane identification system 200 may determine there will be one exit-only lane because there is only one arrow 734 that is colored black and/or because there is only one arrow 734 located within "EXIT ONLY" text box 736. Lane identification system 200 may determine there will be one shared exit lane because there is only one arrow 732 that is white in color.

FIG. 7D shows an exit sign 740 that corresponds to the same exit as exit sign 730, but that appears immediately before the exit. Exit sign 740 includes two arrows 742, 744. Arrows 742 and 744 are rotated upwards and to the right, from which lane identification system 200 may confirm that an exit is impending. Moreover, lane identification system 200 may confirm that there is one exit-only lane and one shared exit lane because there are two arrows 742, 744, and only one arrow 744 is located near "EXIT ONLY" text box 746.

FIG. 7E shows an alternative exit sign 750 with three arrows 752, 754, 756 that may appear in advance of an exit, such as approximately half a mile before an exit. Arrow 752 is white in color, while arrows 754, 756 are black in color and located within "EXIT ONLY" text box 758. Lane identification system 200 may analyze exit sign 750 and determine that an exit is approaching for which there will be two exit-only lanes and one shared exit lane. Lane identification system 200 may determine there will be two exit-only lanes because there are two arrows 754, 756 that are colored black and/or because there are two arrows 754, 756 that are and located within "EXIT ONLY" text box 758. Lane identification system 200 may determine there will be one shared exit lane because there is only one arrow 752 that is white in color.

FIG. 7F shows an exit sign 760 that corresponds to the same exit as exit sign 750, but that appears immediately before the exit. Exit sign 760 includes three arrows 762, 764, 766. Arrows 762, 764, and 766 are rotated upwards and to the right, from which lane identification system 200 may confirm that an exit is impending. Moreover, lane identification system 200 may confirm that there are two exit-only lanes and one shared exit lane because two arrows 764, 766 are located near "EXIT ONLY" text box 768, while one arrow 762 is not.

Thus, lane identification system 200 can determine the existence of exit-only and shared exit lanes in a variety of roadway configurations, including situations involving multiple exit-only lanes.

The above-described components, including the first image processor 210, the second image processor 216, the lane marking detection module, the lane marking categorization module, the exit sign detection module 218, the exit sign analyzer 220, and the identification module 222 may be implemented in software, compiled and stored to a memory as object code, and during operation of the vehicle, may be invoked for execution by a processor. In one implementation, the above-described components are implemented as a single system on a chip. The interconnections among the above-described components can be provided through any suitable electronic communication mechanism, such as a communication bus. Alternatively, the lane identification system 200 may be provided on a common hardware platform as the navigation system 206 and/or the autonomous driving system 208. Thus, the lane identification system 200, the navigation system 206, and the autonomous driving system 208 may be implemented as software complied into object code on one or more memories that, during runtime, are invoked for execution by a processor, such that all systems are provided in a common chip package. Where the lane identification system 200, the navigation system 206, and the autonomous driving system 208 are provided in separate hardware modules, they may communicate with one another through any suitable electronic communication mechanism, such as a communication bus (see FIG. 11).

Whether implemented as one chip module or multiple chip modules, the lane identification system 200, the navigation system 206, and the autonomous driving system 208 may be provided in any convenient location in the vehicles 110, 120, such as behind a dashboard near other electronic circuitry. Such a location may be beneficial for providing convenient access to a power source, and to the electronic systems controlling the vehicle's driving.

The databases 213, 219 may be implemented using any known database environment, such as Oracle, DB2, or SQL Server.

As discussed above, the technologies and techniques for determining exit signs may equally be applied to turn signs. Similar to exit signs on a highway, turn signs appearing on roads may also contain information regarding turning configurations for road segments and also may include lane markings to indicate turn-only and shared turning lanes. One difference between road-based turn signage configurations and highway-based signage configurations is that road-based turn signage may also include additional visual indicia data comprising one or more traffic lights that control the timing and frequency of turns. However, utilizing any of the techniques described herein, a vehicle may be configured to process traffic light data together with sign data to execute turns (e.g., in an autonomous driving mode) or to inform the driver (e.g., in a semi-autonomous mode or driver-control mode) of allowed and/or prohibited turning conditions.

Turning to FIGS. 8A-8E, various examples of turning signs are provided. It should be understood by those skilled in the art that the examples of FIGS. 8A-8E are merely a small subset of possible turn signs, and that any sign comprising graphic and/or textual indicia is contemplated in the present disclosure. As can be seen in FIG. 8A, turn sign 802 may include a graphic portion 802A comprising a "right turn" arrow graphic, and a text portion 804. The example of FIG. 8B shows a sign 806 that includes two graphic portions comprising a shared-lane right turn arrow graphic 806A and a right turn arrow graphic 806B, along with a text portion 808. The example of FIG. 8C shows a turn sign 810 that includes four graphics comprising a plurality of straight-ahead (or "no turn") arrow graphics 810A-810C and a right turn arrow graphic 810D, together with a text portion 812. The examples of FIGS. 8D and 8E show two examples comprising only text.

Similarly, FIGS. 9A-9D show further examples of turning signs. In contrast to the turning signs of FIGS. 8A-8E that facilitate turning, the examples of FIGS. 9A-9D illustrate that turning signs may provide information directed to turning restrictions (e.g., time and/or traffic light condition restrictions). FIG. 9A shows a sign 902 that only includes text. FIG. 9B shows a sign 904 comprising a text portion 904A and a graphics portion 906 configured on a bottom portion of sign 904. FIG. 9C shows a sign 908 comprising a graphics portion 908A on a top portion of sign 904, and a text portion 910 on a bottom portion. FIG. 9D shows a sign 912 have a graphics portion 912A and a complex text portion 914. As used herein, "complex text portion" may refer to text providing information that may be variable or customizable. Text providing specific times or conditions upon which turns can, or cannot, be legally made (e.g., 7 AM-9 AM, 4 PM-6 PM Mon.-Fri; no turning on school days, etc.) are some examples of complex text.

A vehicle (e.g., 101) may be configured to utilize data from a sign data collector (e.g., 204) to process graphic and textual data using one or more cameras and image processor as suggested above to process and determine additional relating to turn sign information. In an illustrative embodiment, the text and graphic information captured by a sign data collector may be configured to process the graphic and text information together as a single image. That image may subsequently be compared to images in a database (e.g., 213, 219) to determine a match, which, in turn, determines the turn data communicated from the turn sign. In another illustrative embodiment, the text information and graphic (non-text) data may be separated, where the graphic data is processed to determine a match, and the text data may be subjected to optical character recognition (OCR) processing to determine the textual data being communicated by a turn sign. As an example, using any of the techniques described herein, a graphic portion of a sign may be processed to determine that a "no turn" graphic is present on a sign. Simultaneously, the text portion of the same sign may be processed to determine the times or conditions which turning is prohibited. Using any of the vehicle's sensors, components and/or modules (see FIG. 13), the vehicle may determine if the prohibitive time or condition is present. If present, the vehicle may not engage in a turning operation (e.g., during an autonomous driving mode), or provide a warning signal to a vehicle display indicating to the driver that a turn is not allowed at a present time. Of course, during an emergency situation, the no-turn condition may be overridden by a driver (e.g., using an override signal provided from a vehicle input) in the appropriate situations.

As is known in the art, a digital image is a matrix (a two-dimensional array) of pixels. The value of each pixel is proportional to the brightness of the corresponding point in the scene; its value is often derived from the output of an A/D converter (103). The matrix of pixels, is typically square and may be thought of as an image as N×N m-bit pixels where N is the number of points along the axes and m controls the number of brightness values. Using m bits gives a range of $2^m$ values, ranging from 0 to $2^m-1$. For example, if m is 8 this would provide brightness levels ranging between 0 and 255, which may be displayed as black and white, respectively, with shades of grey in between, similar to a greyscale image. Smaller values of m give fewer available levels reducing the available contrast in an image. Color images follow a similar configuration with regard to specify pixels' intensities. However, instead of using just one image plane, color images may be represented by three intensity components corresponding to red, green, and blue (RGB) although there other color schemes may be used as well. For example, the CMYK color model is defined by the components cyan, magenta, yellow and black.

In any color mode, the pixel's color can be specified in two main ways. First, an integer value may be associated with each pixel, for use as an index to a table that stores the intensity of each color component. The index is used to recover the actual color from the table when the pixel is going to be displayed, or processed. In this scheme, the table is known as the image's palette and the display is said to be performed by color mapping.

As an alternative, color may be represented by using several image planes to store the color components of each pixel. This configuration is known as "true color" and represents an image more accurately by considering more colors. An advantageous format uses 8 bits for each of the three RGB components, resulting in 24-bit true color images and they can contain 16777 216 different colors simultaneously. Despite requiring significantly more memory, the image quality and the continuing reduction in cost of computer memory make this format a good alternative. Of course, a compression algorithm known in the art may be reduced memory requirements.

Figure 10:
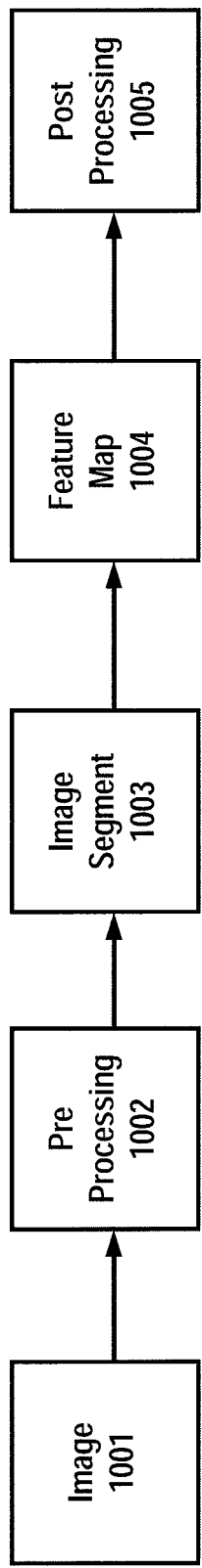
FIG. 10 shows a process for pre-processing image data from an image apparatus and performing image segmentation and extracting feature maps for identifying text and non-text data for a turn sign in an illustrative embodiment.

Turning to FIG. 10, an exemplary process for sign data collector image processing is provided under one embodiment. In this example, the sign data collector image processing is in furtherance of detecting visual indicia of interest. More specifically, the example illustrates a process and method for detecting and identifying text in a sign. Under typical circumstances, OCR processes are optimally configured to detect black text on a white background, which makes it an advantageous technology to use on signs. However, there may be numerous instances where text is interspersed, commingled, or mixed with graphical icons or images. Many of the conventional OCR techniques may be ill-equipped for processing text in these environments.

As a sign data collector image 201 (or "image") is captured 1001 on sign data collector 204, it may be subjected to preprocessing in 1002, which may comprise binarizing, normalizing and/or enhancing the image. Image binarization may be performed to convert the image to a black and white image where a threshold value is assigned, and all pixels with values above this threshold are classified as white, and all other pixels as black. Under a preferred embodiment adaptive image binarization is performed to select an optimal threshold for each image area. Here, a value for the threshold is selected that separates an object from its background, indicating that the object has a different range of intensities to the background. The maximum likelihood of separation may be achieved by selecting a threshold that gives the best separation of classes, for all pixels in an image. One exemplary and advantageous technique for this is known as "Otsu binarization" which may automatically perform histogram shape-based image thresholding or the reduction of a gray-level image to a binary image. This technique operates by assuming that the image to be thresholded contains two classes of pixels or bi-modal histogram (e.g., foreground and background) then calculates the optimum threshold separating those two classes so that their combined spread (intra-class variance) is minimal. This technique may be extended to multi-level thresholding as well. It should be appreciated by those skilled in the art that other suitable binarization techniques are applicable as well.

Next image segmentation 1003 is performed to partition the image into multiple segments (i.e., sets of pixels, or superpixels). During segmentation, pixels are grouped such that each pixel is assigned a value or label, and pixels with the same value/label are identified as sharing specific characteristics. As such, objects and boundaries (lines, curves, etc.) may be more readily located and identified. The result of image segmentation is a set of segments that collectively cover the entire image, or a set of contours extracted from the image (such as edge detection, discussed in greater detail below). Each of the pixels in a region would be deemed similar with respect to some characteristic or computed property, such as color, intensity, or texture. Adjacent regions would be deemed different with respect to the same characteristic(s).

In block 1104, feature extraction is performed to generate a feature map that may be used for text detection. In one exemplary embodiment, the feature extraction is based on edge detection, which is advantageous in that it tends to be immune to changes in overall illumination levels. As edge detection highlights image contrast (difference in intensity), the boundaries of features within an image may be emphasized. Essentially, the boundary of an object reflects a step change in the intensity levels, and the edge may be found at the position of the step change. To detect the edge position first order differentiation may be utilized in order to generate responses only when image signals change. A change in intensity may be determined by differencing adjacent points. Differencing horizontally adjacent points will detect vertical changes in intensity (horizontal edge-detector). Thus, a horizontal edge detector applied to an image Img, the action of the horizontal edge-detector forms the difference between two horizontally adjacent points, as such detecting the vertical edges, Ex, as $Ex_{x,y} = |Img_{x,y} - Img_{x+1,y}|$ for $\forall x \in 1, N-1$; $y \in 1, N$. To detect horizontal edges, a vertical edge-detector is used to difference vertically adjacent points. Accordingly, horizontal intensity changes may be detected, and thus detecting the horizontal edges, Ey, according to $Ey_{x,y} = |Img_{x,y} - Img_{x,y+1}|$ for $\forall x \in 1, N$; $y \in 1, N-1$. Combining the two provides operator E that may detect horizontal and vertical edges together according to $E_{x,y} = |Img_{x,y} - Img_{x+1,y} + Img_{x,y} - Img_{x,y+1}|$ which may be used to provide the coefficients of a differencing template which can be convolved with an image to detect all the edge points. The result of first order edge detection will typically be a peak where the rate of change of the original signal is greatest.

Some suitable first order edge detector operators include Prewitt, Sobel and Canny edge detectors. Canny edge detection may be preferred as it provides optimal detection with minimal spurious responses, has good localization with minimal distance between detected and true edge position and provides a single response to eliminate multiple responses to a single edge. Briefly, Canny edge detection utilizes Gaussian filtering for image smoothing, where the coefficients of a derivative of a Gaussian template is calculated and the first order differentiation is combined with Gaussian smoothing. To mark an edge at the correct point, and to reduce multiple responses, the image may be convolved with an operator which gives the first derivative in a direction normal to the edge. The maximum of this function should be the peak of the edge data, where the gradient in the original image is sharpest, and hence the location of the edge. Non-maximum suppression may be used to locate the highest points in the edge magnitude data. Hysteresis thresholding may be used to set points to white once an upper threshold is exceeded and set to black when the lower threshold is reached.

In another embodiment, higher order derivatives, such as second order edge detection operators may be used. A second order derivative would be greatest where the rate of change of the signal is greatest and zero when the rate of change is constant (i.e., the peak of the first order derivative), which in turn would indicate a zero-crossing in the second order derivative, where it changes sign. Accordingly, a second order differentiation applied and zero-crossings may be detected in the second order information. Suitable operators for second order edge detection include Laplace operators or a Marr-Hildreth operator.

Once feature extraction is performed in 1104, post-processing may be performed in 1105 for additional (sharpening) filtering and to localize existing text regions for classification. Subsequently, character extraction may be performed. As suggested in FIG. 4B above, it can be seen in the simplified example that an image may be divided into regions bounded by a plurality of vertical borders and horizontal borders. In one illustrative embodiment, larger regions may also be formed bounded by a plurality of vertical borders and horizontal borders. These regions may be used under an embodiment for image analysis. Text regions in images have distinct characteristics from non-text regions such as high density gradient distribution, distinctive texture and structure, which can be used to differentiate text regions from non-text regions effectively. Utilizing region-based techniques, graphic and text detection and text localization may be effectively performed. For text detection, features of sampled regional windows are extracted to determine whether they contain text information. Then window grouping or clustering methods are employed to generate candidate text lines, which can be seen as coarse text localization. In some cases, post-processing such as image segmentation or profile projection analysis may be employed to localize texts further. Classification may be performed using support vector machines to obtain text based on the processed features.

Figure 11:
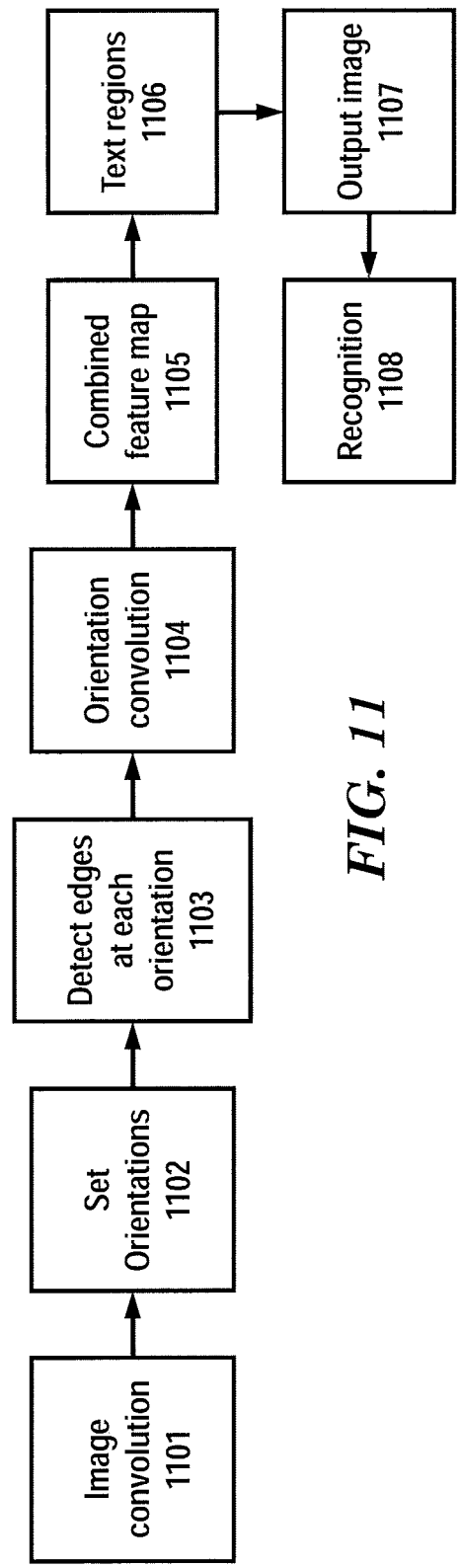
FIG. 11 shows a process for processing image data from an image apparatus where an image convolution and is performed, where edges may be detected at each orientation, and wherein orientation convolution may be performed to generate a feature map where text regions for a turn sign may be identified under an illustrative embodiment.

Turning to FIG. 11, an embodiment is disclosed for edge-based text region extraction and identification. As mentioned above, edges are a reliable feature of graphic and text detection regardless of color/intensity, layout, orientations, and so forth. Edge strength, density and orientation variance are three distinguishing characteristics of text, particularly when embedded in images, which can be used as main features for detecting text. Accordingly, the configuration of FIG. 11 may be advantageous for candidate text region detection, text region localization and character extraction. Starting from 1101, a sign data collector image may be processed by convolving the image with a Gaussian kernel and successively down-sampling each direction by a predetermined amount (e.g., ½). The feature map used for the processing is preferably a gray-scale image with the same size of the sign data collector image, where the pixel intensity represents the possible presence of text.

Under a preferred embodiment, a magnitude of the second derivative of intensity is used as a measurement of edge strength to provide better detection of intensity peaks that normally characterize text in images. The edge density is calculated based on the average edge strength within a window. As text may exist in multiple orientations for a given sign data collector image, directional kernels may be utilized to set orientations 1102 and detect edges at multiple orientations in 1103. In one embodiment, four orientations (0°, 45°, 90°, 135°) are used to evaluate the variance of orientations, where 0° denotes horizontal direction, 90° denotes vertical direction, and 45° and 135° are the two diagonal directions, respectively. Such a configuration may advantageously be used to detect "closed" designations over signs that often may appear as diagonal (e.g., 45°) text overlaying the entire sign. Each image may be convolved in the Gaussian filter with each orientation. A convolution operation with a compass operator will result in four oriented edge intensity images containing the necessary properties of edges required for processing.

Preferably, multiscale images may be produced for edge detection using Gaussian pyramids which successively low-pass filter and down-sample the original image reducing image in both vertical and horizontal directions. Generated multiscale images may be simultaneously processed by a compass operator as individual inputs. As regions containing text will have significantly higher values of average edge density, strength and variance of orientations than those of non-text regions, these characteristics may be used to generate a feature map 1105 which suppresses the false regions and enhances true candidate text regions. The feature map ($f_{map}$) may be generated according to $$f_{map}(i, f) = \bigoplus_{x=0}^{n} \sum_{\theta} N\left\{ \sum_{x=-c}^{c} \sum_{y=-c}^{c} E(s, \theta, i+x, j+y) \times W(i, j) \right\}$$

where $\oplus$ is an across-scale addition operation employing a scale fusion and n is the highest level of scale determined by the resolution of the captured image. $\theta$ refers to the different orientations used (0°, 45°, 90°, 135°) and N is a normalization operation. (i, j) are coordinates of an image pixel, while W(i, j) is the weight for pixel (i, j), whose value is determined by the number of edge orientations within a window, whose window size is determined by a constant c. Generally, the more orientations a window has, the larger weight the center pixel has. By employing the non linear weight mapping described above, text regions may be more readily detected from non-text regions.

In 1106, text region localization is performed by processing clusters found in the feature map. These clusters may be found according to threshold intensities found in the feature map. Global thresholding may be used to highlight regions having a high probability of text, where a morphological dilation operation may be used to connect close regions together (thus signifying the potential presence of a letter/word, or "text blobs") while isolating regions farther away for independent grouping (i.e., signifying other potential letters/words). Generally speaking, a dilation operation expands or enhances a region of interest using a structural element of a specific shape and/or size. The dilation process is executed by using a larger structural element (e.g., 7×7) in order to enhance the regions that lie close to each other. The resulting image after dilation may still include some non-text regions or noise that should be eliminated. Area based filtering is carried out to eliminate noise blobs by filtering all the very small isolated blobs and blobs having widths that are much smaller than corresponding heights. The retained blobs may be enclosed in boundary boxes, where multiple pairs of coordinates of the boundary boxes are determined by the maximum and minimum coordinates of the top, bottom, left and right points of the corresponding blobs. In order to avoid missing those character pixels which lie near or outside of the initial boundary, width and height of the boundary box may be padded by small amounts.

The resulting output image 1107 may comprise extracted accurate binary characters from the localized text regions for OCR recognition in 1108, where the text would appear as white character pixels in a black background. Sub-images for the text are extracted according to the boundary boxes according to a thresholding algorithm that segments the text regions. In another illustrative embodiment, connected component based text region extraction may be utilized, where sign data collector color images are converted to grayscale images, and an edge image is generated using a contrast segmentation algorithm, which in turn uses the contrast of the character contour pixels to their neighboring pixels. This is followed by the analysis of the horizontal projection of the edge image in order to localize the possible text areas. After applying several heuristics to enhance the resulting image created in the previous step, an output image is generated that shows the text appearing in the input image with a simplified background.

Figure 12B:
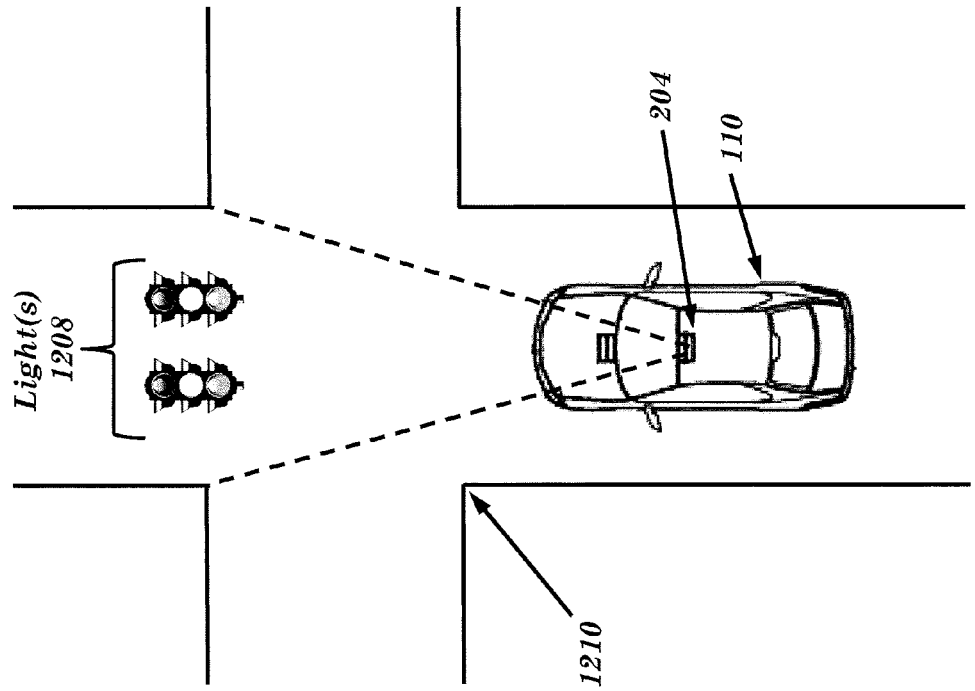
FIG. 12B shows one or more data collectors configured to collect image data from one or more street lights to determine a street light status and utilize the street light status to determine if the status complies with the one or more turning rules determined in the example of FIG. 12A in an illustrative embodiment.
Figure 12A:
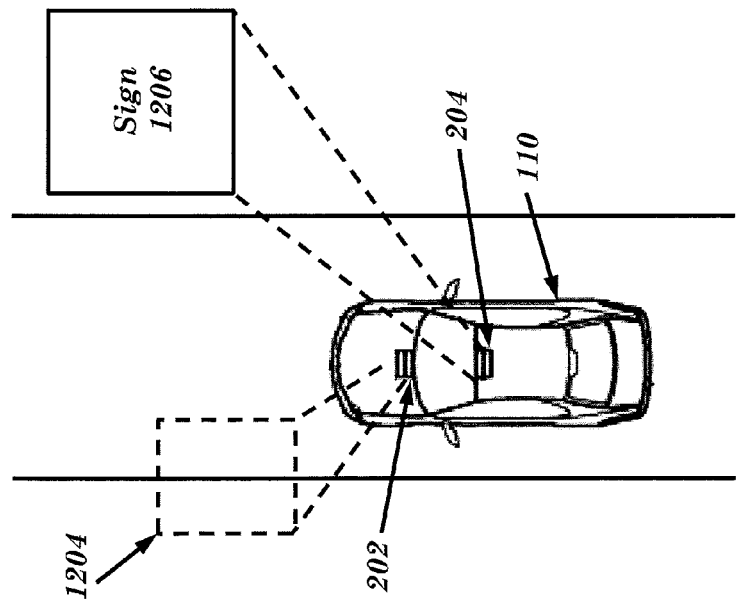
FIG. 12A shows one or more data collectors configured to collect lane marking and sign data using one or more image processors configured to process data collected by the one or more data collectors to determine turn rules in advance of an exit/intersection.

Accordingly, in use, FIG. 12A shows a simplified example where lane marking data collector 202 of vehicle 110 may obtain lane marking data (e.g., standard frequency dashed lane markings, high frequency dashed lane markings, solid lane markings, etc.) and sign data collector 204 may capture image data from sign 1206 in advance of an exit/intersection. Processing the graphic and/or text information provided by sign 1206, vehicle 110 may determine (1) if an upcoming exit/turn is approaching, (2) if the vehicle 110 is in a proper lane for exiting/turning, and (3) any conditions for legally exiting/turning. The vehicle 110 may then process and store sign 1206 information in advance of approaching intersection 1206.

FIG. 12B shows an example where the vehicle 110 of FIG. 12A has now approached the intersection 1210 relating to sign 1206, wherein sign data collector 204 now collects visual data relating to one or more street lights 1208. As street lights 1208 are purposefully illuminated, sign data collector 204 may be advantageously configured to determine if a street light is green, yellow or red, based on illumination intensity, position, and color of lights in 1208. Once such a determination is made, vehicle 110 may initiate one of a turn enablement status or turn prohibition status for the vehicle 110 based on the data collected from sign 1206 and the color of one or more street lights 1208. In one illustrative embodiment, vehicle 110 may simultaneously capture and process sign data and street light data.

It should be understood by those skilled in the art that multiple variations for enabling or prohibiting turning are contemplated in the present disclosure. In some illustrative embodiments, the lane marking data collector 202 and/or sign data collector 204 may be integrated into a vehicle system that allows additional communication of data among the lane marking data collector 202 and/or sign data collector 204 and various vehicle electronics modules, subsystems and/or components.

Figure 13:
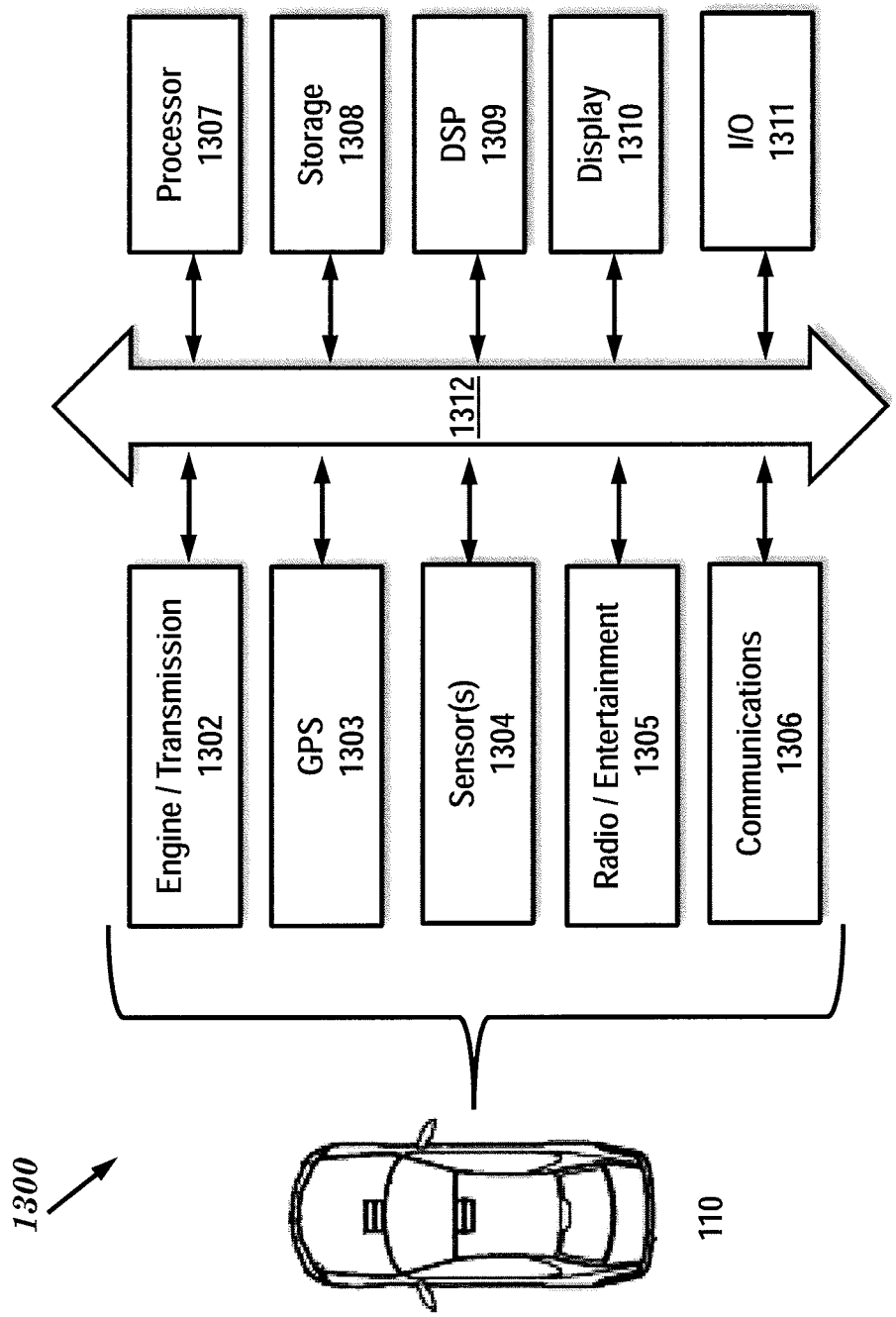
FIG. 13 shows an exemplary vehicle system for a vehicle for lane identification and sign content detection comprising various vehicle electronics modules, subsystems and/or components.

Turning to FIG. 13, the drawing illustrates an exemplary vehicle system 1300 for vehicle 111 comprising various vehicle electronics modules, subsystems and/or components. Engine/transmission module 1302 is configured to process and provide vehicle engine and transmission characteristic or parameter data, and may comprise an engine control unit (ECU), and a transmission control. For a diesel engine, module 1302 may provide data relating to fuel injection rate, emission control, NOx control, regeneration of oxidation catalytic converter, turbocharger control, cooling system control, and throttle control, among others. For a gasoline engine, module 1302 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals.

Global positioning system (GPS) module 1303 provides navigation processing (see FIG. 5), location data and traffic data for vehicle 110. Sensors 1304 provides sensor data which may comprise data relating to vehicle characteristic and/or parameter data (e.g., from 1302), and may also provide environmental data pertaining to the vehicle, its interior and/or surroundings, such as temperature, humidity and the like. Sensors 1304 also include object detection sensors, such as radar, Light Detection and Ranging (LIDAR), GPS, and computer vision. Radio/entertainment module 1305 may provide data relating to audio/video media being played in vehicle 110. Module 1305 may be integrated and/or communicatively coupled to an entertainment unit configured to play AM/FM radio, satellite radio, compact disks, DVDs, digital media, streaming media and the like. Communications module 1306 allows any of the modules to communicate with each other and/or external devices via a wired connection or wireless protocol, such as Wi-Fi, Bluetooth, NFC, etc. In one embodiment, modules 1302-1306 may be communicatively coupled to bus 1312 for certain communication and data exchange purposes.

Vehicle 110 may further comprise a main processor 1307 that centrally processes and controls data communication throughout the system of FIG. 13, and may provide control signals to any module to enable, disable or modify operation. For example, processor 1307 may perform any of the sign identification and/or lane identification techniques described herein and may provide intermittent braking, short braking and/or extended braking signals to effect one or more braking operations on vehicle 1301. In another example, processor 1307 may provide acceleration and/or deceleration signals to control the velocity of vehicle 1301. In other examples, processor 1307 may provide a combination or series of braking, acceleration/deceleration signals. Processor 1307 may be configured as a single processor, or may be configured as a plurality of processors, sub processors and/or processing modules. Storage 1308 may be configured to store instructions, data, software, media, files and the like. Digital signal processor (DSP) 1309 may comprise a processor separate from main processor 1307, or may be integrated within processor 1307. Generally speaking, DSP 1309 may be configured to take signals, such as sensor signals, images, voice, audio, video, temperature, pressure, position, etc. that have been digitized and then process them as needed. Display 1310 may be configured to provide visual (as well as audio) indicial from any module in FIG. 13, and may be a configured as a LCD, LED, OLED, or any other suitable display. Display may also be configured with audio speakers for providing audio output. Input/output module 1311 is configured to provide data input and outputs to/from other peripheral devices, such as keyboards, key pads, joysticks, knobs, key fobs, device controllers and the like. As discussed above, modules 1307-1311 may be communicatively coupled to data bus 1312 for transmitting/receiving data and information to/from other modules.

As suggested above, the various modules of FIG. 13 may be combined with the lane marking data collector 202 and/or sign data collector 204 to provide enhanced or additional features. For example, various databases regarding turning rules may be downloaded by vehicle 110 via communications 1306, and turning designations may be supplemented or substituted for sign data collector 204 using GPS coordinates. Thus, as a vehicle approaches an intersection and activates a blinker, the turning rules for the intersection at the GPS point may be accessed to determine times and/or conditions upon which turns may be legally executed. In another example, one or more of sensors 1304 may be utilized to determine the presence of cross-traffic pedestrians in the path of the turning lane, or to determine the presence of pedestrians waiting to cross (e.g., to comply with "no turning when pedestrians are present" rules). Other sensors may be used to ensure that the vehicle comes to a complete stop before beginning the turning process.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for determining rules for a turn on a roadway, the system comprising:
   a first image apparatus for obtaining lane marking image data from the roadway;
   a lane marking detection module for detecting lane markings on the roadway from the lane marking image data;
   a second image apparatus for obtaining at least one of image data and text data from a roadway sign;
   a sign analyzer module for detecting at least one of a graphic image and text from the at least one of image data and text data respectively;
   means for detecting lane markings as one of standard frequency dashed lane markings, high frequency dashed lane markings, and solid lane markings and for identifying a turn-only lane and a shared turn lane in response to the detected lane markings;
   and means for determining rules for turning for an intersection of the roadway based on the at least one of the graphic image and recognition and interpretation of the detected text.

2. The in-vehicle system of claim 1, wherein the second image apparatus is configured to obtain street light image data for the intersection.

3. The in-vehicle system of claim 2, wherein the means for determining rules for turning for an intersection is configured to compare the street light image data with the determined rules.

4. The in-vehicle system of claim 3, further comprising communications for transmitting a warning signal if the means for determining rules for turning for an intersection determines that the street light image data does not comply with the determined rules.

5. The in-vehicle system of claim 3, further comprising communications for transmitting a turn engagement signal if the means for determining rules for turning for an intersection determines that the street light image data complies with the determined rules.

6. An in-vehicle system for determining rules for a turn on a roadway, the system comprising:
   an image apparatus configured to obtain image data comprising (i) at least one of graphic data and text data from a roadway sign, and (ii) street light image data for an intersection on the roadway;
   an analyzer module configured to process the image data to detect at least one of a graphic image and text from the image data relating to the roadway sign, and to process the street light image data to determine a street light status; and
   an identification module for determining rules for turning on the intersection of the roadway based on the processed image data relating to the roadway sign, wherein the identification module is further configured to determine if the turn on the roadway is allowed based on the determined street light status, and wherein the identification module is further configured to determine the rules for turning on the intersection based at least in part on recognition and interpretation of the detected text data.

7. The in-vehicle system of claim 6, wherein the analyzer module is configured to perform optical character recognition (OCR) from the image data relating to the roadway sign to detect text data.

8. The in-vehicle system of claim 7, wherein the identification module is configured to determine the rules for turning on the intersection based at least in part on the detected text data.

9. The in-vehicle system of claim 8, further comprising communications for transmitting a warning signal if the identification module determines that the determined street light status does not comply with the determined rules.

10. The in-vehicle system of claim 6, wherein the analyzer module is configured to detect graphic images from the graphic data.

11. The in-vehicle system of claim 9, wherein the identification module is configured to compare the detected graphic image to one or more stored graphic images to determine a matching graphic image, wherein the identification module is configured to determine the rules for turning on the intersection based at least in part on the matching graphic image.

12. The in-vehicle system of claim 11, further comprising communications for transmitting a warning signal if the identification module determines that the determined street light status does not comply with the determined rules.

13. The in-vehicle system of claim 6, further comprising:
a second image apparatus for obtaining lane marking image data from the roadway; and
a lane marking detection module for detecting lane markings on the roadway from the lane marking image data, wherein the lane marking detection module is configured to detect lane markings as one of standard frequency dashed lane markings, high frequency dashed lane markings, and solid lane markings and for identifying a turn-only lane and a shared turn lane in response to the detected lane markings.

14. The in-vehicle system of claim 13, wherein the identification module is further configured to determine if the turn on the roadway is allowed based on the detected lane marking.

15. A method for determining rules for a turn on a roadway via an in-vehicle system, comprising:
obtaining image data via an image apparatus, the image data comprising (i) at least one of graphic data and text data from a roadway sign, and (ii) street light image data for an intersection on the roadway;
processing the image data via an analyzer module to detect at least one of a graphic image and text from the image data relating to the roadway sign, and to process the street light image data to determine a street light status; and
determining rules for turning on the intersection of the roadway, via an identification module, based on the processed image data relating to the roadway sign, wherein the identification module is further configured to determine if the turn on the roadway is allowed based on the determined street light status;
wherein the identification module is further configured to determine the rules for turning on the intersection based at least in part on recognition and interpretation of the detected text data.

16. The method of claim 15, further comprising performing optical character recognition (OCR) from the image data relating to the roadway sign via the analyzer module to detect text data.

17. The method of claim 16, further comprising determining the rules for turning on the intersection, via the identification module, based at least in part on the detected text data.

18. The method of claim 17, further comprising transmitting, via communications, a warning signal if the identification module determines that the determined street light status does not comply with the determined rules.

19. The method of claim 15, further comprising detecting, via the analyzer module, graphic images from the graphic data.

20. The method of claim 19, further comprising comparing, via the identification module, the detected graphic image to one or more stored graphic images to determine a matching graphic image, and determining the rules for turning on the intersection based at least in part on the matching graphic image.

21. The method of claim 20, further comprising transmitting, via communications, a warning signal if the identification module determines that the determined street light status does not comply with the determined rules.

22. The method of claim 15, further comprising:
obtaining, via a second image apparatus, lane marking image data from the roadway; and
detecting, via a lane marking detection module, lane markings on the roadway from the lane marking image data,
wherein detecting lane markings comprise one of standard frequency dashed lane markings, high frequency dashed lane markings, and solid lane markings and for identifying a turn-only lane and a shared turn lane in response to the detected lane markings.

23. The method of claim 22, wherein the identification module is further configured to determine if the turn on the roadway is allowed based on the detected lane marking.

\* \* \* \* \*